United States Patent
Sellen et al.

(10) Patent No.: US 7,108,174 B2
(45) Date of Patent: Sep. 19, 2006

(54) SYSTEMS AND METHODS FOR DETECTING CORPORATE FINANCIAL TRANSACTIONS

(75) Inventors: Kerry Sellen, Kemah, TX (US);
Cheryl Phillips, Maple Shade, NJ (US)

(73) Assignee: First Data Corporation, Greenwood Village, CO (US)

( * ) Notice: Subject to any disclaimer, the term of this patent is extended or adjusted under 35 U.S.C. 154(b) by 173 days.

(21) Appl. No.: 10/674,801

(22) Filed: Sep. 30, 2003

(65) Prior Publication Data

US 2005/0067484 A1 Mar. 31, 2005

(51) Int. Cl.
G06Q 40/00 (2006.01)
G07D 11/00 (2006.01)
G07F 19/00 (2006.01)

(52) U.S. Cl. ............... 235/379; 235/380; 235/449; 705/45

(58) Field of Classification Search ............... 235/379, 235/435, 439, 449, 380; 705/35, 39, 44, 705/45
See application file for complete search history.

(56) References Cited

U.S. PATENT DOCUMENTS

| | | | | |
|---|---|---|---|---|
| 5,668,897 | A * | 9/1997 | Stolfo | 382/283 |
| 5,679,938 | A | 10/1997 | Templeton et al. | |
| 5,679,940 | A | 10/1997 | Templeton et al. | |
| 5,924,737 | A * | 7/1999 | Schrupp | 283/58 |
| 5,930,777 | A | 7/1999 | Barber | |
| 6,212,504 | B1 * | 4/2001 | Hayosh | 705/64 |
| 6,505,772 | B1 | 1/2003 | Mollett et al. | |
| 6,547,132 | B1 | 4/2003 | Templeton et al. | |
| 6,581,043 | B1 | 6/2003 | Wallin et al. | |
| 6,611,598 | B1 * | 8/2003 | Hayosh | 380/54 |
| 6,902,105 | B1 * | 6/2005 | Koakutsu | 235/379 |
| 2002/0178112 | A1 * | 11/2002 | Goeller et al. | 705/39 |
| 2003/0093368 | A1 | 5/2003 | Manfre et al. | |
| 2003/0130919 | A1 * | 7/2003 | Templeton et al. | 705/35 |
| 2003/0216987 | A1 | 11/2003 | Mollett et al. | |
| 2003/0216988 | A1 | 11/2003 | Mollett et al. | |
| 2003/0217003 | A1 | 11/2003 | Weinflash et al. | |
| 2003/0217014 | A1 | 11/2003 | Mollett et al. | |
| 2003/0225686 | A1 | 12/2003 | Mollett et al. | |
| 2003/0229586 | A1 * | 12/2003 | Repak | 705/39 |
| 2003/0233325 | A1 * | 12/2003 | Belyi | 705/42 |
| 2005/0067484 | A1 * | 3/2005 | Sellen et al. | 235/379 |

FOREIGN PATENT DOCUMENTS

| | | |
|---|---|---|
| WO | WO 01/197134 A1 | 12/2001 |
| WO | WO 03/042790 A2 | 5/2003 |
| WO | WO 03/083751 A1 | 10/2003 |

* cited by examiner

*Primary Examiner*—Uyen-Chau N. Le
(74) *Attorney, Agent, or Firm*—Knobbe Martens Olson & Bear LLP

(57) ABSTRACT

Systems and methods for electronically processing financial transactions involving corporate checks. A front end device at a location associated with a merchant and a check processing service configured to detect and process corporate checks. In one embodiment, the detection of the corporate check is achieved at the front end device by reading of an auxiliary on-us field in the check's magnetic ink character recognition (MICR) line. Such information denoting the check as a corporate check is used by the check processing service to at least partially base its assessment of whether to approve and process the corporate check electronically.

55 Claims, 20 Drawing Sheets

SYSTEMS AND METHODS FOR DETECTING CORPORATE FINANCIAL TRANSACTIONS

BACKGROUND

1. Field

The present teachings generally relate to processing of financial transactions and in particular, relates to processing of electronic transactions involving corporate checks.

2. Description of the Related Art

Many check transactions between a customer and a merchant begin electronically at a point of purchase associated with the merchant. One way to convert a check to an electronic information is to scan the check at the point of purchase. The check may be scanned to generate a substantially full image or a partial image. The scanning of the check typically includes reading of the check's magnetic ink character recognition (MICR) line having information that facilitates subsequent electronic processing of the check. Typically, the information obtained from the scanned check is transmitted to a check processing service that processes the check transaction in a variety of manners.

In a typical electronic processing of a check, the electronic check information is transmitted from the merchant to the check processing service. The processing service then determines whether the check transaction should be approved based on factors such as risk assessment and the level of service subscribed by the merchant. If the check transaction is approved, the processing service may forward the transaction information to an Automated Clearing House (ACH) for paperless execution of appropriate debit and credit entries for the customer and the merchant. Such electronic processing of checks is substantially advantageous in both efficiency and cost.

Conventional systems and methods for processing checks in the foregoing manner are usually geared for processing of personal checks. Personal checks differ from corporate checks in the physical formats of the checks, as well as in the manner in which they are processed. Consequently, when a corporate check is presented to a merchant, it usually cannot be processed in a similar manner as the personal checks to thereby enjoy the benefits associated with electronic check processing. Thus from the foregoing, there is an ongoing need for an improved approach to the manner in which electronic financial transactions involving corporate checks are conducted.

SUMMARY

Various aspects of the present teachings relate to systems and methods for electronically processing financial transactions involving corporate checks. A front end device at a location associated with a merchant and a check processing service can be configured to detect and process corporate checks. In one embodiment, the detection of the corporate check is achieved at the front end device by reading of an auxiliary on-us field in the check's magnetic ink character recognition (MICR) line. Such information denoting the check as a corporate check is used by the check processing service to at least partially base its assessment of whether to approve and process the corporate check electronically.

One aspect of the present teachings relates to a method of electronically processing a check at a merchant location. The method comprises scanning the check to obtain information about the check that facilitates electronic processing of the check. The information about the check includes a magnetic ink character recognition (MICR) line imprinted on the check. The method further comprises determining whether the check is a corporate check or a non-corporate check based on the presence or absence of an auxiliary on-us field on the MICR line.

In one implementation, the method further comprises denoting the information about the check to allow processing as a corporate check transaction if the auxiliary on-us field is present. In one implementation, the method further comprises communicating the information about the check to a check processing service that authorizes or declines the check transaction. The information about the check allows the check processing service to process the check as a cash concentration disbursement (CCD) transaction via an automated clearing house (ACH) if the check is a corporate check. The processing service performs a risk assessment of the check based at least partly on the information about the check to determine whether to authorize or decline the check. The processing service determines whether to authorize or decline the check based at least partly on a type of service subscribed by the merchant. The processing service can guarantee the check it authorizes or purchase the check from the merchant, thereby assuming a risk associated with the scanned check.

In one implementation, determining whether the check is a corporate check or a non-corporate check comprises determining whether the auxiliary on-us field is present on the left side of the check's transit field. In one implementation, the method further comprises obtaining an image of at least a portion of the check upon determination that the check is a corporate check.

Another aspect of the present teachings relates to an apparatus for processing a check at a merchant location. The apparatus comprises a scanning component adapted to scan at least a portion of the check to obtain information about the check that facilitates electronic processing of the check. The scanned portion of the check includes a magnetic ink character recognition (MICR) line imprinted on the check. The apparatus further comprises a processor configured to determine whether the paper check is a corporate check or a non-corporate check based on the presence or absence of an auxiliary on-us field on the MICR line.

In one embodiment, the processor is further configured to denote the information about the check to allow processing as a corporate check transaction if the auxiliary on-us field is present. In one embodiment, the apparatus further comprises a communication component that facilitates communicating of the information about the check to a check processing service that authorizes or declines the check transaction. The information about the check allows the check processing service to process the check as a cash concentration disbursement (CCD) transaction via an automated clearing house (ACH) if the check is a corporate check. The processing service performs a risk assessment of the check based at least partly on the information about the check to determine whether to authorize or decline the check. The processing service determines whether to authorize or decline the check based at least partly on a type of service subscribed by the merchant. The processing service can guarantee the check it authorizes, or purchase the check from the merchant, thereby assuming a risk associated with the scanned check.

In one embodiment, the processor determines whether the check is a corporate check or a non-corporate check by determining whether the auxiliary on-us field is present on the left side of the check's transit field. In one embodiment, the processor further induces obtaining of an image of at least a portion of a check upon determination that the check is a corporate check.

Yet another aspect of the present teachings relates to a method of processing a check transaction at a merchant location. The method comprises obtaining information about the check transaction to allow at least a portion of subsequent processing of the check transaction to be performed electronically. The method further comprises determining whether the check transaction is a corporate check transaction or a non-corporate check transaction based on the presence or absence of a field associated with the information about the check transaction.

In one implementation, obtaining information about the check transaction comprises scanning a check. In one implementation, scanning the check includes reading a magnetic ink character recognition (MICR) line imprinted on the check. In one implementation, determining whether the check transaction is a corporate or non-corporate check transaction comprises determining the presence or absence of an auxiliary on-us field on the MICR line. The presence of the auxiliary on-us field is indicative of a corporate check transaction. In one implementation, determining the presence or absence of the auxiliary on-us field on the MICR line comprises determining whether the auxiliary on-us field is present on the left side of the check's transit field.

In one implementation, the method further comprises denoting the information about the check transaction to allow processing as a corporate check transaction if the field is present. In one implementation, the field comprises an auxiliary on-us field on a magnetic ink character recognition (MICR) line associated with the corporate check transaction.

In one implementation, the method further comprises communicating the information about the check transaction to a check processing service that authorizes or declines the check transaction. The information about the check transaction allows the check processing service to process the check as a cash concentration disbursement (CCD) transaction via an automated clearing house (ACH) if the check is a corporate check. The check processing service performs a risk assessment of the check based at least partly on the information about the check transaction to determine whether to authorize or decline the check. The check processing service determines whether to authorize or decline the check transaction based at least partly on a type of service subscribed by the merchant. The type of service can include the check processing service guaranteeing the check transaction it authorizes or purchasing the check transaction from the merchant thereby assuming a risk associated with the check transaction.

In one implementation, the method further comprises obtaining and retaining an image of at least a portion of the check associated with the check transaction upon determination that the check transaction is a corporate check transaction.

Yet another aspect of the present teachings relates to a method of conducting a financial transaction. The method comprises obtaining information about the financial transaction to allow at least a portion of, subsequent processing of the financial transaction to be performed electronically. The information is obtained via an electronic device associated with a merchant involved in the financial transaction. The method further comprises determining whether the financial transaction is a corporate type transaction or a non-corporate type transaction based on the presence or absence of a field associated with the information.

In one implementation, determination of whether the financial transaction is a corporate or a non-corporate type is performed at the electronic device associated with the merchant. In one implementation, the financial transaction comprises a check transaction. In one implementation, obtaining information comprises scanning a check. In one implementation, obtaining information comprises capturing information input into a computing device. In one implementation, the computing device is configured to perform a web based financial transaction. In one implementation, obtaining information comprises capturing information input into a telephone during a telephone based financial transaction.

In one implementation, obtaining information includes reading of a magnetic ink character recognition (MICR) information associated with the check transaction. In one implementation, determining whether the check transaction is a corporate type or a non-corporate type transaction comprises determining whether the MICR information includes an auxiliary on-us field. The presence of the auxiliary on-us field is indicative that the check transaction is a corporate type transaction.

In one implementation, the method further comprises denoting the information about the check transaction to allow processing as a corporate check transaction if the field is present. In one implementation, the method further comprises communicating the information about the check transaction to a check processing service that authorizes or declines the check transaction. In one implementation, the information about the check transaction allows the check processing service to process the corporate check as a cash concentration disbursement (CCD) transaction via an automated clearing house (ACH). In one implementation, the check processing service performs a risk assessment of the check based at least partly on the information about the check transaction to determine whether to authorize or decline the check. In one implementation, the check processing service determines whether to authorize or decline the check transaction based at least partly on a type of service subscribed by the merchant. The type of service can include the check processing service guaranteeing the check transaction it authorizes or purchasing the check transaction from the merchant thereby assuming a risk associated with the check transaction.

In one implementation, the method further comprises obtaining and retaining an image of at least a portion of a check for financial transactions involving checks upon determination that the financial transaction is a corporate type.

Yet another aspect of the present teachings relates to an apparatus for conducting a financial transaction. The apparatus comprises an electronic device that obtains information about the financial transaction. The electronic device is configured to capture a field associated with the information. The electronic device is associated with a merchant involved in the financial transaction. The apparatus further comprises a processor configured to induce the capture of the field and to detect the presence of the field. The processor determines whether the financial transaction is a corporate type transaction or a non-corporate type transaction based on the presence or absence of the field.

In one embodiment, the financial transaction comprises a check transaction. In one embodiment, the electronic device comprises a check scanner adapted to capture at least a portion of the check it scans. In one embodiment, the electronic device comprises a computing device configured to capture the information about the check transaction. In one embodiment, the computing device is configured to perform a web based financial transaction. In one embodiment, the electronic device comprises a telephone based device adapted to allow a telephone based financial transaction.

In one embodiment, the information about the financial transaction obtained by the electronic device includes a magnetic ink character recognition (MICR) information associated with the check transaction. In one embodiment, the processor determines whether the check transaction is a corporate type or a non-corporate type transaction by determining whether the MICR information includes an auxiliary on-us field. The presence of the auxiliary on-us field is indicative that the check transaction is a corporate type transaction.

In one embodiment, the processor denotes the information about the check transaction in a manner that allows processing of the check transaction as a corporate check transaction if the field is present. In one embodiment, the apparatus further comprises a communication component configured to communicate the information about the check transaction to a check processing service that authorizes or declines the check transaction. In one embodiment, the information about the check transaction allows the check processing service to process the corporate check as a cash concentration disbursement (CCD) transaction via an automated clearing house (ACH).

In one embodiment, the check processing service performs a risk assessment of the check based at least partly on the information about the check transaction to determine whether to authorize or decline the check. In one embodiment, the check processing service determines whether to authorize or decline the check transaction based at least partly on a type of service subscribed by the merchant. In one embodiment, the type of service includes the check processing service guaranteeing the check transaction it authorizes or purchasing the check transaction from the merchant thereby assuming a risk associated with the check transaction.

In one embodiment, the processor induces obtaining of at least a portion of a check for financial transactions involving checks upon determination that the financial transaction is a corporate type.

Yet another aspect of the present teachings relates to an apparatus for conducting a financial transaction. The apparatus comprises a first means for obtaining information about the financial transaction by an electronic device. The apparatus further comprises a second means for determining whether the financial transaction is a corporate type transaction or a non-corporate type transaction based on at least a portion of the information about the financial transaction.

In one embodiment, the first means comprises obtaining information about a check transaction. In one embodiment, the information about the check transaction is obtained by scanning a check. In one embodiment, the information about the check transaction is obtained by a computing device. In one embodiment, the computing device is configured to perform a web based financial transaction. In one embodiment, the information about the check transaction is obtained by a telephone based device adapted to perform a telephone based financial transaction.

In one embodiment, the first means includes reading of a magnetic ink character recognition (MICR) information associated with the check transaction. In one embodiment, the second means comprises determining whether the MICR information includes an auxiliary on-us field. The presence of the auxiliary on-us field is indicative that the check transaction is a corporate type transaction. In one embodiment, the second means further comprises denoting the information about the check transaction to allow processing as a corporate check transaction if the auxiliary on-us field is present.

In one embodiment, the apparatus further comprises a third means for communicating the information about the check transaction to a check processing service that authorizes or declines the check transaction. In one embodiment, the information about the check transaction allows the check processing service to process the corporate check as a cash concentration disbursement (CCD) transaction via an automated clearing house (ACH). In one embodiment, the check processing service performs a risk assessment of the check based at least partly on the information about the check transaction to determine whether to authorize or decline the check. In one embodiment, the check processing service determines whether to authorize or decline the check transaction based at least partly:on a type of service subscribed by the merchant. In one embodiment, the type of service includes the check processing service guaranteeing the check transaction it authorizes or purchasing the check transaction from the merchant thereby assuming a risk associated with the check transaction.

In one embodiment, the second means further comprises obtaining an image of at least a portion of a check for financial transactions involving checks upon determination that the financial transaction is a corporate type.

DETAILED DESCRIPTION OF CERTAIN EMBODIMENTS

Figure 1:
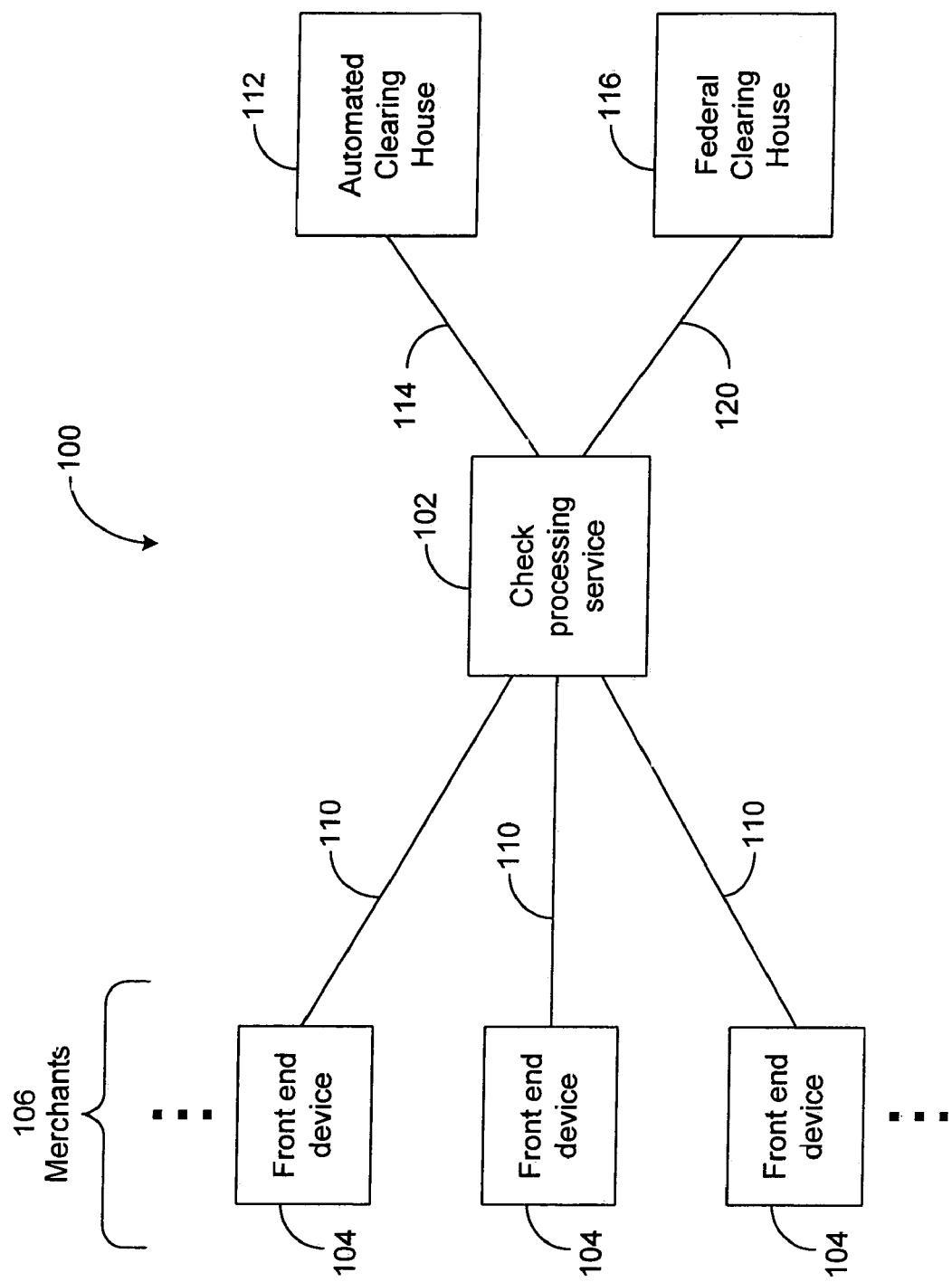
FIG. 1 illustrates a block diagram of a system configured to conduct electronic check transactions.

These and other aspects, advantages, and novel features of the present teachings will become apparent upon reading the following detailed description and upon reference to the accompanying drawings. In the drawings, similar elements have similar reference numerals.

The present teachings generally relate to various aspects and embodiments of systems and methods of conducting electronic financial transactions. As shown in FIG. 1, one aspect of the present teachings relates to a financial transaction processing system 100 comprising a financial transaction processing service 102 linked to a plurality of subscribing merchants 106. As shown in FIG. 1 and in other figures, the financial transaction processing service 102 is depicted (and described herein) as a check processing service that processes check related transactions. It will be appreciated, however, that the novel features of the present teachings are not necessarily limited to the check related transactions, and can be practices in other types of electronic transactions. For example, credit card related transactions or bank transactions involving non-checking accounts may be performed using the advantageous features of the present teachings.

In one aspect, the present teachings allows electronic processing of transactions that are corporate based. In certain embodiments of the present teachings, corporate type transactions as well as non-corporate type transactions may be processed in an advantageous manner by the merchants 106 and/or the processing service 102. Manners in which the corporate type transactions are identified and processed are described below in greater detail.

As shown in FIG. 1, a subscribing merchant has associated with it a front end device 104 that is communicationally linked to the processing service 102 via a link 110. The processing service 102 receives information about a financial transaction involving the subscribing merchant via the link 110, and processes the information. As is known in the art, the processing service can offer a variety of services to the subscribing merchant, depending on the merchant's type of subscription. For example, the merchant's subscription may be such that the processing service 102 instructs the merchant to simply either accept or decline a received check based on some risk assessment. In another example, the processing service 102 can purchase the received check from the subscribing merchant and bear the risk of the check, such that the subscribing merchant does not need to worry whether the received check is good or bad.

As is also shown in FIG. 1, in one embodiment, the processing service 102 is linked to an Automated Clearing House (ACH) 112 (as indicated by a line 114) and a Federal Clearing House (FCH) 116 (as indicated by a line 120). As is known, the FCH 116 typically handles paper drafts of checks, and the ACH 112 typically handles electronic check transactions.

Figure 2:
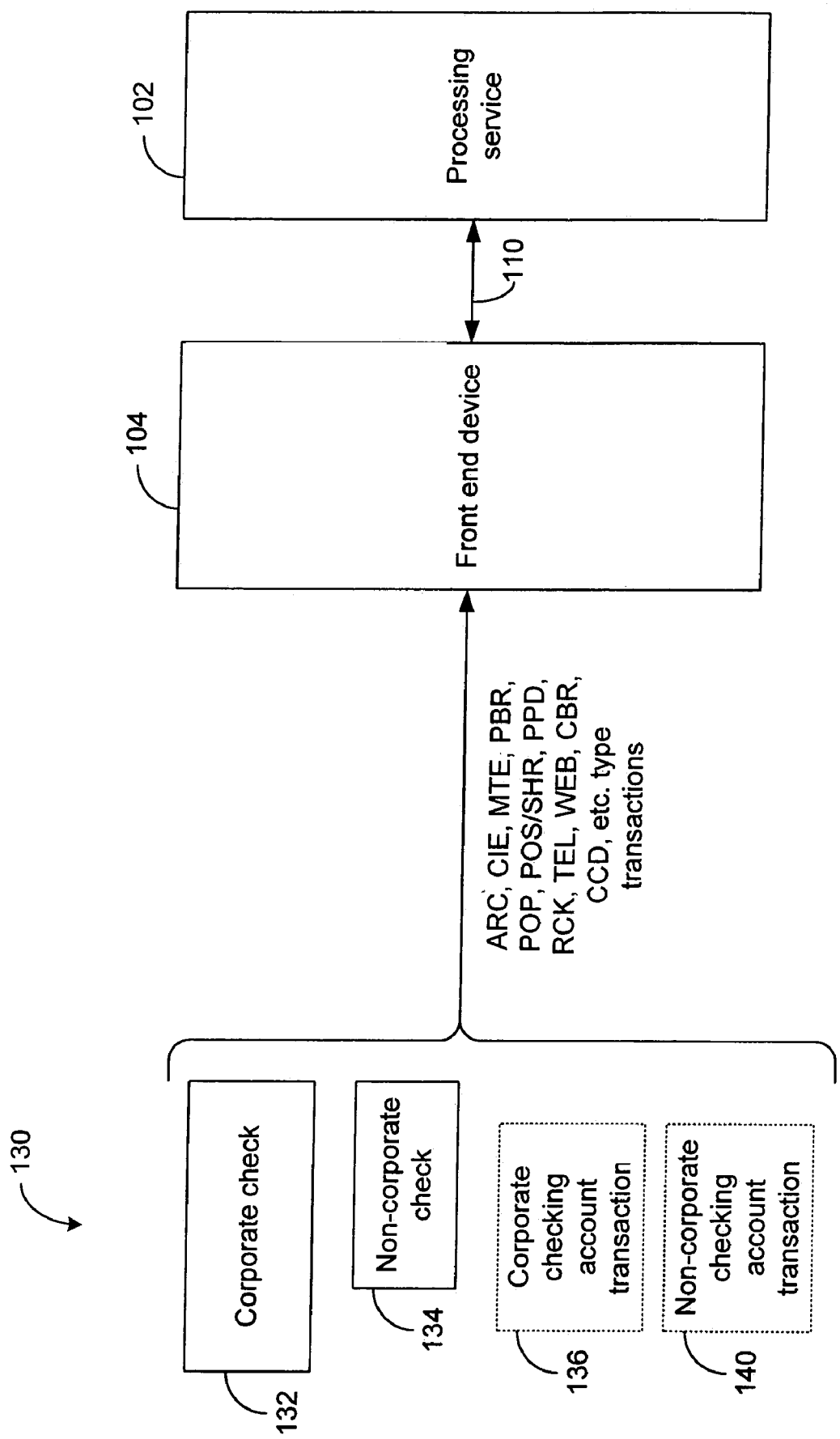
FIG. 2 illustrates a block diagram of a front end device configured to allow at least some of the various types of electronic check transactions.

As illustrated in FIG. 2, one aspect of the present teachings relates to the front end device 104 configured to accept as inputs 130, at least some of various check related transactions including but not limited to a corporate check 130, a non-corporate check 134, a corporate checking account related transaction 136, and/or a non-corporate checking account related transaction 140. Such inputs 130 may allow subsequent processing of the transaction via various Standard Entry Class Codes (SEC Codes—an ACH convention) including but not limited to, Accounts Receivable Conversion (ARC), Customer Initiated Entry (CIE), Machine Transfer Entry (MTE), Consumer Cross-Border Payment (PBR), Point of Purchase (POP), Point of Sale/Shared Network Transaction (POS/SHR), Prearranged Payment and Deposit (PPD), Re-presented Check (RCK), Telephone-Initiated (TEL), Internet-Initiated (WEB), Corporate Cross-Border Payment (CBR), Cash Concentration/Disbursement (CCD), and the like. As is known in the art, the various exemplary SEC Codes can be generally classified as Consumer Applications, Corporate Applications, and Other Applications. For example, the POP code is associated with the Consumer Applications, and the CCD code is associated with the Corporate Applications.

As shown in FIG. 2, the front end device 104 receiving the various types of financial transactions is linked to the processing service 102 via the link 110. One aspect of the present teachings relates to the front end device 104 configured to distinguish a corporate type financial transaction from a non-corporate type transaction. Various embodiments and implementations of such systems and methods are described below in greater detail.

Another aspect of the present teachings relates to the processing service 102 configured to process a received transaction (from the front end device 104) as either a corporate type financial transaction or a non-corporate type transaction. A possible system and method having such a capability is described below in greater detail.

Figure 3:
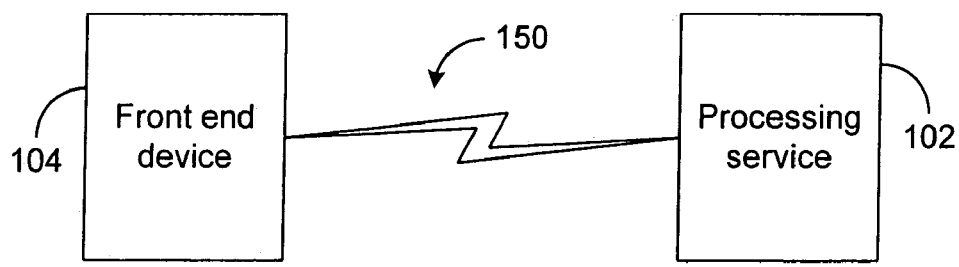
FIG. 3 illustrates a block diagram of a communication link between the front end device and a processing service that processes check transactions.

FIG. 3 illustrates that the front end device 104 is linked to the processing service 102 via a communication link 150. Such a communication link 150 may be achieved in a number of ways, and some possible modes of communication link are illustrated in FIGS. 4A–D.

Figure 4A:
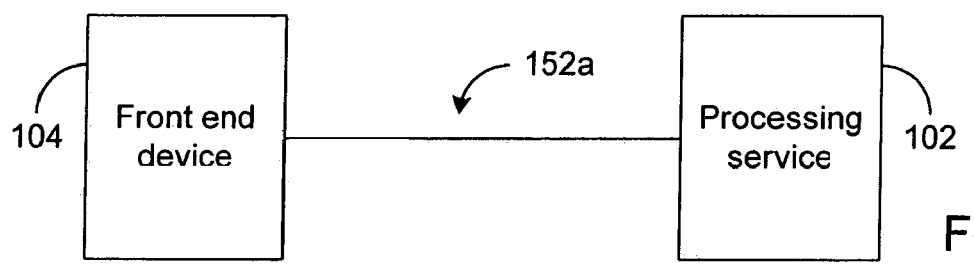
FIGS. 4A–D illustrate some of the possible communication links between the front end device and the processing service.

FIG. 4A shows that the communication link 150 may comprise a conductor based connection 152a. Such conductor based connection 152a may include by way of example, a telephone line, a telecommunication cable, a dedicated line, and the like.

Figure 4B:
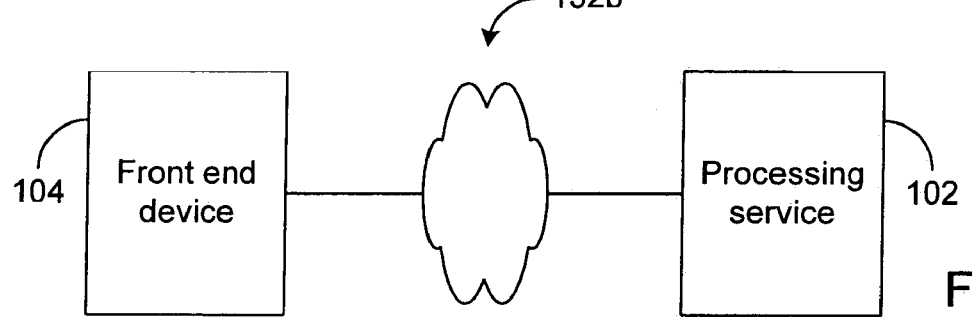

FIG. 4B shows that the communication link 150 may comprise a network based connection 152b. For example, the communication between the front end device 104 and the processing service 102 may occur via the Internet.

Figure 4C:
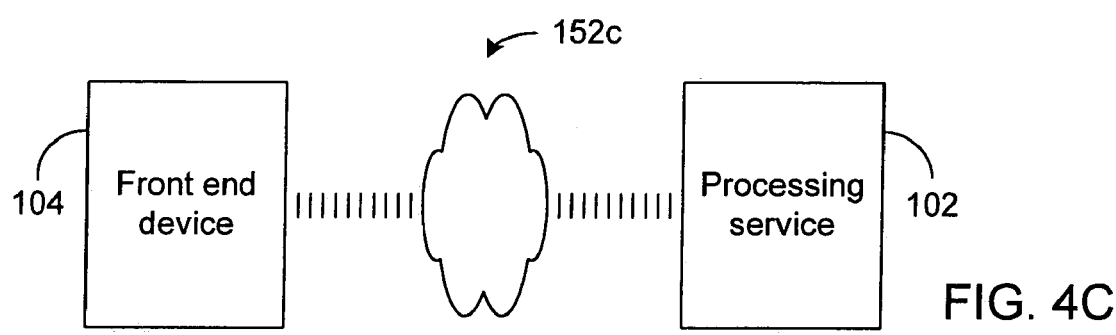

FIG. 4C shows that the communication link 150 may comprise a wireless link 152c. Such a link may be facilitated by some form of a network such as an Internet or a telecommunication network.

Figure 4D:
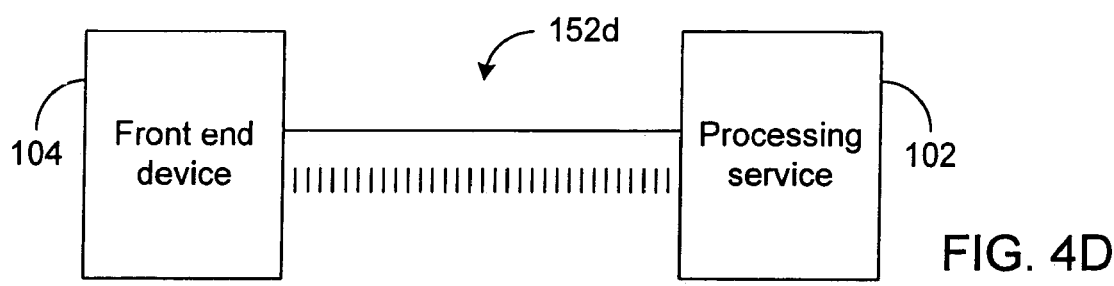

FIG. 4D shows that the communication link 150 may comprise a link 152d having some combination of a line based component and a wireless component. Thus, it will be appreciated that the front end device 104 and the processing service 102 can be linked in any number of ways utilizing various communication means available without departing from the spirit of the present teachings.

Figure 5A:
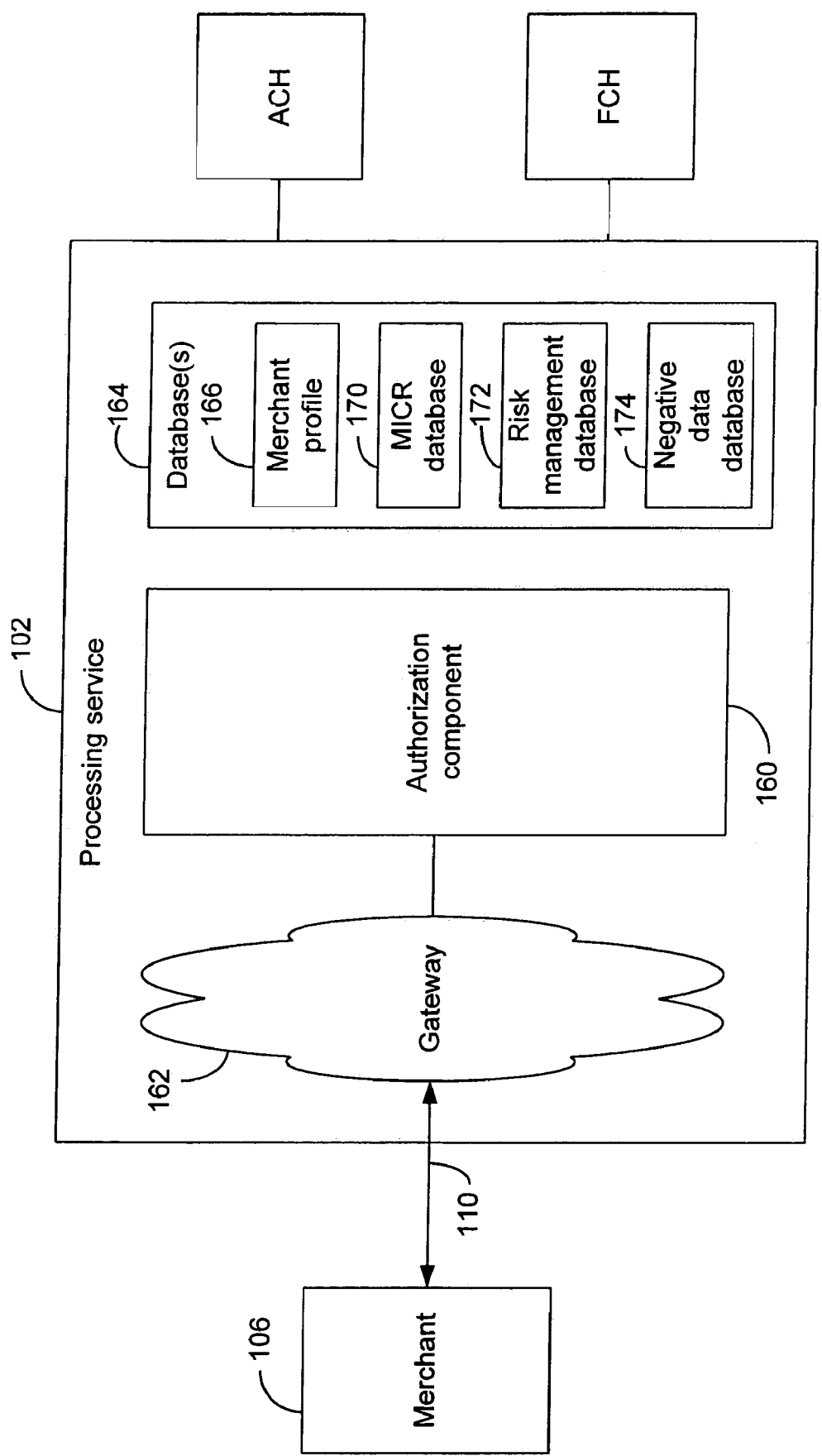
FIG. 5A illustrates a block diagram of one possible configuration of the processing service adapted to perform communication with merchants and authorize electronic check transactions for the merchants.

FIG. 5A now illustrates one possible embodiment of the processing service 102 that allows electronic processing of corporate type financial transactions, including transactions involving corporate checks. The processing service 102 comprises a gateway 162 that communicates with the merchant 106 via the link 110. As described above in reference to FIGS. 3–4, the link 110 may comprise a variety of communication means. The gateway 162 may be configured to receive electronic information about the various types of financial transactions input into the front end device (not shown in FIG. 5A) associated with the merchant 106. The gateway 162 may also be configured to transmit decisions or other information associated with the service's processing of the financial transaction information.

In general, the gateway 162 may comprise one or more computers tasked for allowing communication between the processing service 102 and the plurality of merchants' front end devices. Such a task may include, but not limited to, routing incoming and outgoing data, providing a firewall that inhibits unauthorized access, and providing a secure link between the processing service 102 and the subscribing merchants (via, for example, encrypted communication link).

The processing service 102 further comprises an authorization component 160 configured to authorize or decline electronic financial transactions. In one embodiment, the authorization component 160 is configured to authorize or decline acceptance and processing of a corporate check received at a location associated with the merchant 106 in a manner described below.

As shown in FIG. 5A, the authorization component 160 may perform its authorization function facilitated by one or more database 164. Such a database 164 may comprise a merchant profile database 166 having information about the merchant 106. The database 164 may also comprise a check information database 170 having information about a magnetic ink character recognition (MICR) line associated with the check being processed. The database 164 may also comprise a risk management database 172 having information that facilitates risk assessment(s) performed by the authorization component 160 or some other component associated with the authorization component 160. The database 164 may also comprise a negative data database 174 having information about previous transactions that resulted in a negative disposition.

It will be appreciated that, although the various databases 166, 170, 172, 174 are depicted to be within the database 164, such a relationship is for descriptive purpose only, and in no way limit the manner in which the databases are configured. For example, the various databases may be part of a single large database. The various databases can also be physically separate from each other, and also physically separate from the database 164. Furthermore, the database 164 may also be physically located outside of the processing service 102, and be accessible by the authorization component 160. Thus, it will be appreciated that the system of processing service 102 depicted in FIG. 5A is a functional block diagram, and in no way intended to limit the scope of how such service 102 can be configured.

Figure 5B:
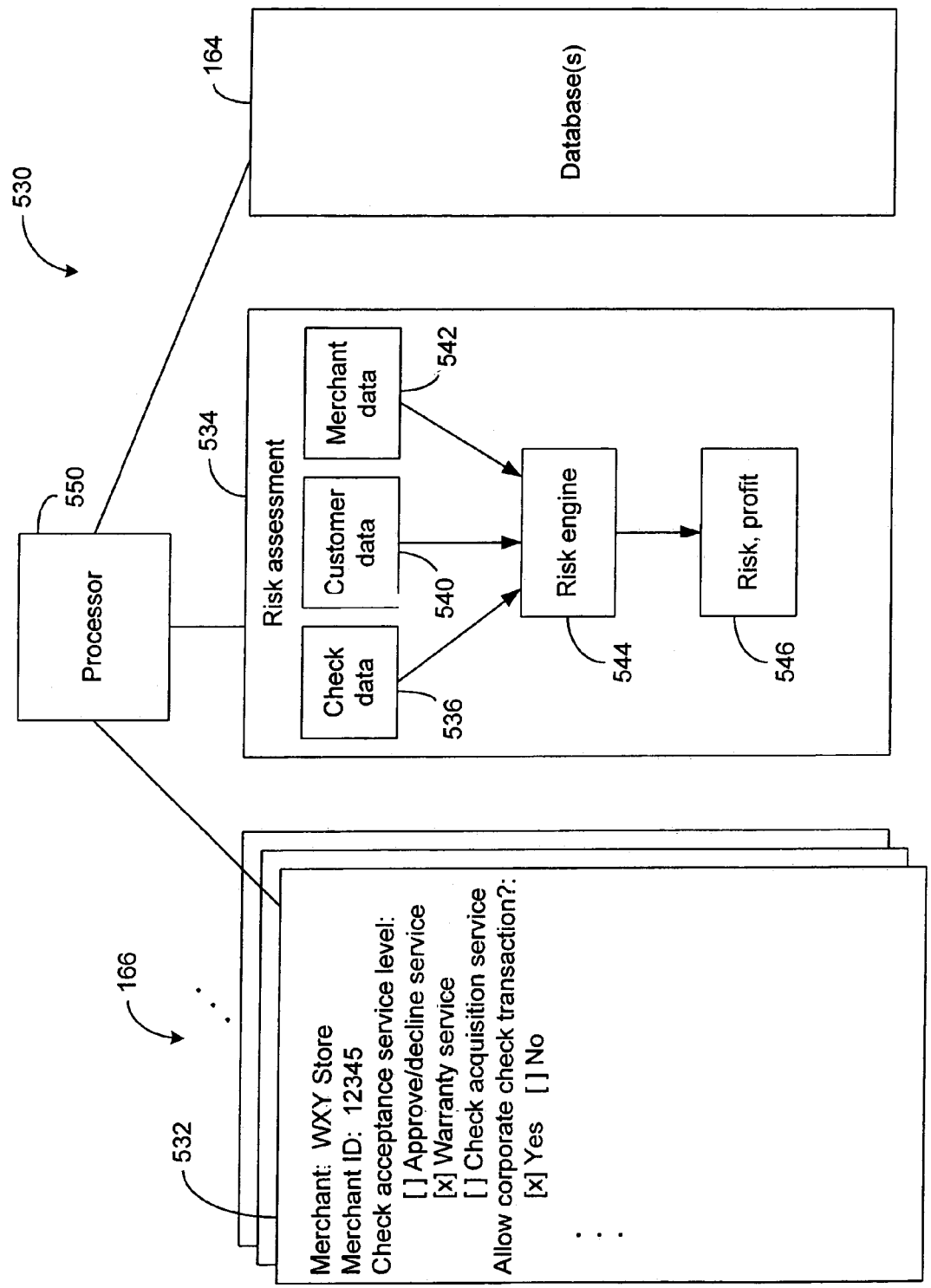
FIG. 5B illustrates a block diagram of how the electronic check transaction may be authorized based on information about the merchant and an assessment of risk associated with the check.

FIG. 5B now illustrates one embodiment of an exemplary authorization component 530 that authorizes or declines the check transaction. As is evident from FIG. 5B, the authorization "component" 530 may comprise a combination of processors, databases, data, programs, and the like. Similar to the databases described above in reference to FIG. 5A, such "parts" of the authorization component 530 may be integrated at a single location, located at different locations, or be configured in any possible combination.

The exemplary authorization component 530 comprises a processor 550 that accesses information related to the check transaction and determines whether to authorize or decline the transaction. In one implementation, the processor 550 accesses the merchant profile database 166 having information about a plurality of merchants. For example, an exemplary merchant "WXY Store" has associated with it a profile 532. Such a profile may include merchant name, merchant identifier, check acceptance level, corporate check transaction capability, etc.

The check acceptance level may include several services available to subscribing merchants, with each service level having a corresponding service fee. In one implementation, the service level options include a basic approve/decline service where the merchant still assumes the risk even if the check is approved. The merchant may also choose a warranty service where the check processing service guarantees that check will clear if it approves the transaction. In such a service, the check processing service assumes the risk once it approves the check. The merchant may also choose a check acquisition service where the check processing service buys the checks from the merchant and assumes the risks associated with the checks. It will be appreciated that any of a number of different service levels can be provided to the merchant without departing from the spirit of the present teachings.

As shown in FIG. 5B, the exemplary merchant profile 532 indicates that the exemplary merchant "WXY Store" has selected the exemplary warranty service. The profile 532 also indicates that "WXY Store" is capable of conducting corporate check transactions.

In one implementation, the processor 550 obtains information about the merchant from the merchant profile database 166, and transfers at least some of that information to perform a risk assessment (indicated by a block 534). Thus, a merchant data input 542 may be obtained in the foregoing manner. Other inputs such as a check data input 536 and a customer data input 540 may also be obtained in a similar manner. The exemplary data 536, 540, and 542 are depicted to be input into a risk engine 544 that performs a risk analysis process and outputs a risk score 546 that is indicative of the transaction parameters such as a risk of the transaction relative to the profit of the transaction.

FIG. 5B also shows the database 164 described above in reference to FIG. 5A. Such a database may be accessed by the processor 550 to facilitate the risk assessment. As shown in FIG. 5B and described above, the exemplary merchant profile database 166 may be located anywhere (with respect to the other databases and the check processing service) accessible by the authorization component without departing from the spirit of the present teachings.

In certain implementations, the risk assessment assigns a risk score based on various factors associated with the check transaction. Such factors can weigh the likelihood that the check will return against the likelihood that the check will clear. Such balancing of risk of a bad check against the potential profit for a successful transaction may depend on factors such as the amount of the check, check writer's history, check writing frequency at the time of check submission, location and type of business associated with the merchant, merchant's check transaction history, and the like. The check transaction may be approved if the risk score determined in such a manner is above a certain level. The check transaction can be declined if the risk score is below a certain level. In certain implementations, an intermediate risk score between the "authorize" and "decline" score levels may trigger an additional risk assessment that assesses the potentially profitable check transaction in greater detail.

In certain implementations, the risk assessment for a corporate check may be performed in a similar manner, with a factor such as the check writing company's fiscal "history" being treated similarly as the check writer's history in the risk score determination. Moreover, because some corporate checks are likely to involve greater check amounts, the check amount factor may be treated differently than that for a personal check. It will be appreciated that the risk assessments for both the corporate and personal checks may be performed in any of a number of ways without departing from the spirit of the present teachings.

Figure 6A:
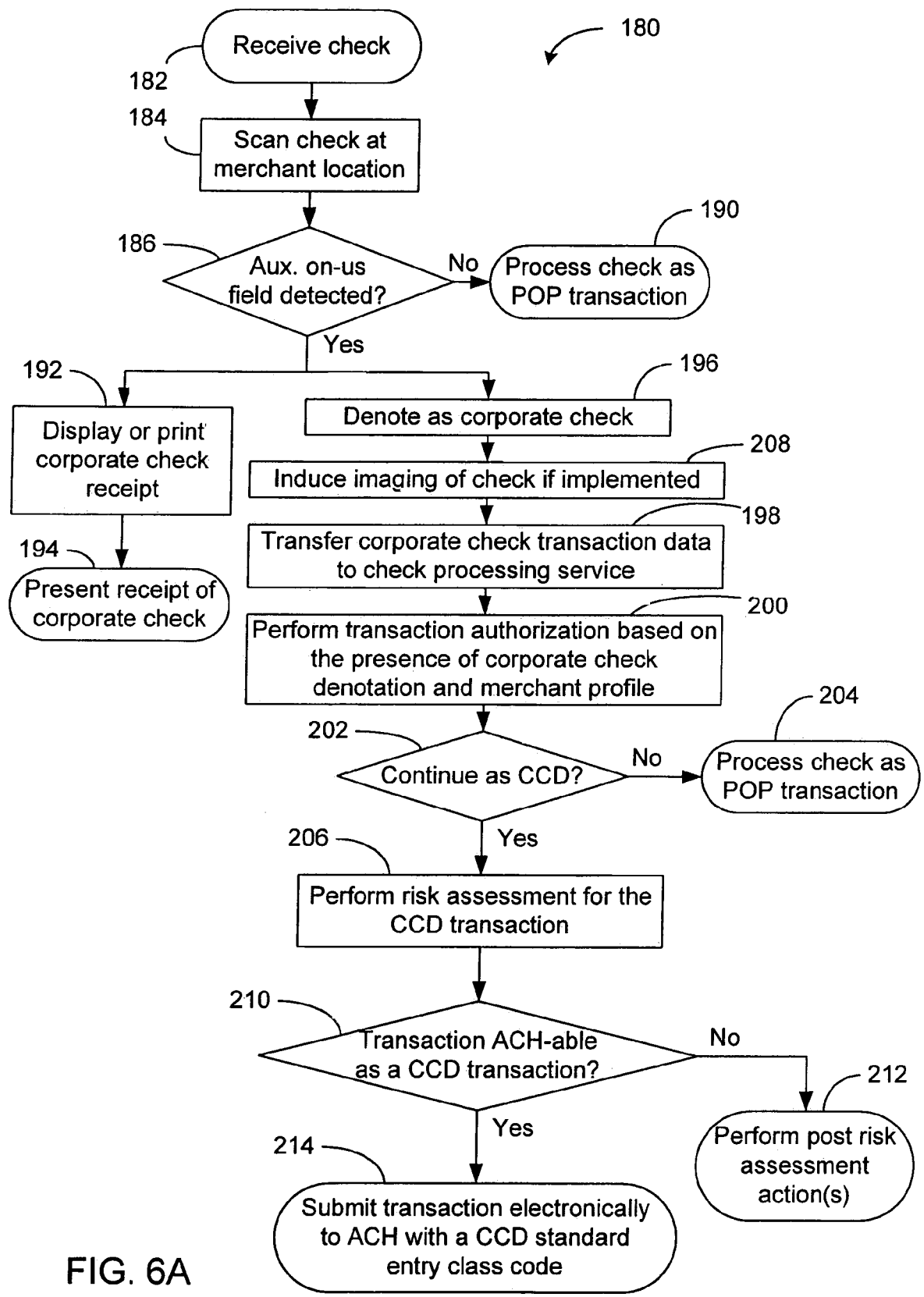
FIG. 6A illustrates a process for conducting an electronic check transaction at a location associated with the merchant and at the processing service.

FIG. 6A now illustrates one implementation of a process 180 for conducting an electronic check transaction via the merchant and the check processing service described herein. In particular, the process 180 allows electronic processing of a corporate check as a CCD transaction. The process 180 begins in state 182 where the merchant receives a check as part of a financial transaction. The check may be received either in person, by mail, via some form of a drop box, and in any other manner. In step 184, the received check is scanned at a location associated with the merchant. Some possible embodiments of devices that allow such scanning and also facilitate subsequent processing as a CCD transaction are described below in greater detail. The location associated with the merchant may or may not be on the same premises as the merchant's place of business. For example, the location where the check is scanned may be physically within the merchant's place of business (e.g., a store). Alternatively, the checks may be scanned at a location away from the merchant's place of business.

In check-related transactions where information about a check is obtained from a customer (e.g., in a web-based check transaction), a paper check does not need to be scanned. In such a transaction, the information about the check transaction may bypass the merchant's place of business and be transmitted to a third party entity (such as an internet service provider) for further processing. Thus, it will be understood that "location associated with the merchant" may include the merchant's place of business or any entity that facilitates merchant's performance of electronic financial transactions.

Following step 184, the process 180 in step 186 determines if an auxiliary on-us field is detected in the scanned check. If not detected, the process 180 processes the scanned check as a POP transaction in state 190.

If the auxiliary on-us field is detected, the process 180 in step 192 induces displaying or printing of a receipt having language adapted for a CCD transaction. The process 180 in step 196 can also denote the transaction as a corporate check transaction. In certain implementations of the process 180, the device that scans the check may be configured to obtain an image of the check if the check is determined to be a corporate check. It will be appreciated that the image of the check may comprise a substantially full check image, or snippets of portion(s) of the check. In certain implementations, the check may already have been imaged during the scanning step 184, and the process 180 may retain such an image in step 208. In certain implementations, the check scanning in step 184 may comprise reading of the MICR; the process 180 in step 208 may induce the check to be scanned to obtain the check image upon determination that the check is a corporate check.

In step 198 that follows, the process 180 transfers transaction data with the corporate check denotation to a check processing service. It will be appreciated that steps 192 and 196 may be performed in sequence, or as depicted in FIG. 6A, in parallel, without departing from the spirit of the present teachings. When the step 192 "branch" is performed in parallel (to the step 196 branch), that branch may terminate in state 194 where the receipt for a corporate check is presented or caused to be presented to the customer. When the step 192 branch is performed in series with the step 196 branch, steps similar to 192 and 194 may be performed prior to or after step 196.

It will be appreciated that the corporate check denotation may comprise any number of formats, including but not limited to the auxiliary on-us field information. Some exemplary types of corporate check denotation are described below:

The process 180 continues in step 200 where an authorization process is performed on the transaction data. In one aspect, the authorization process is based on the presence of the corporate check denotation and a profile associated with the merchant. The process 180 in step 202 determines whether the transaction should continue as a CCD transaction based on decision(s) in step 200. If the answer is "no," then the process 180 processes the transaction data as a POP transaction in state 204.

If the answer is "yes," the process 180 in step 206 performs a risk assessment on the transaction data as a CCD transaction. Based on the risk assessment, the process 180 in step 210 determines whether the transaction should be processed electronically via the ACH as a CCD transaction. If the answer is "no," the process 180 in state 212 performs a post-risk assessment action(s) that may include instructing the merchant to decline the check or keep and process the check as paper. If the answer is "yes," the process 180 in state 214 submits the transaction electronically to the ACH with a CCD SEC Code.

In one implementation, the process 180 described above in reference to FIG. 6A occurs at the merchant location as well as the check processing service. Thus, steps 182, 184, 186, 190, 192, and 194 preferably occur at the location associated with the merchant, and the other steps preferably occur at the check processing service.

Figure 6B:
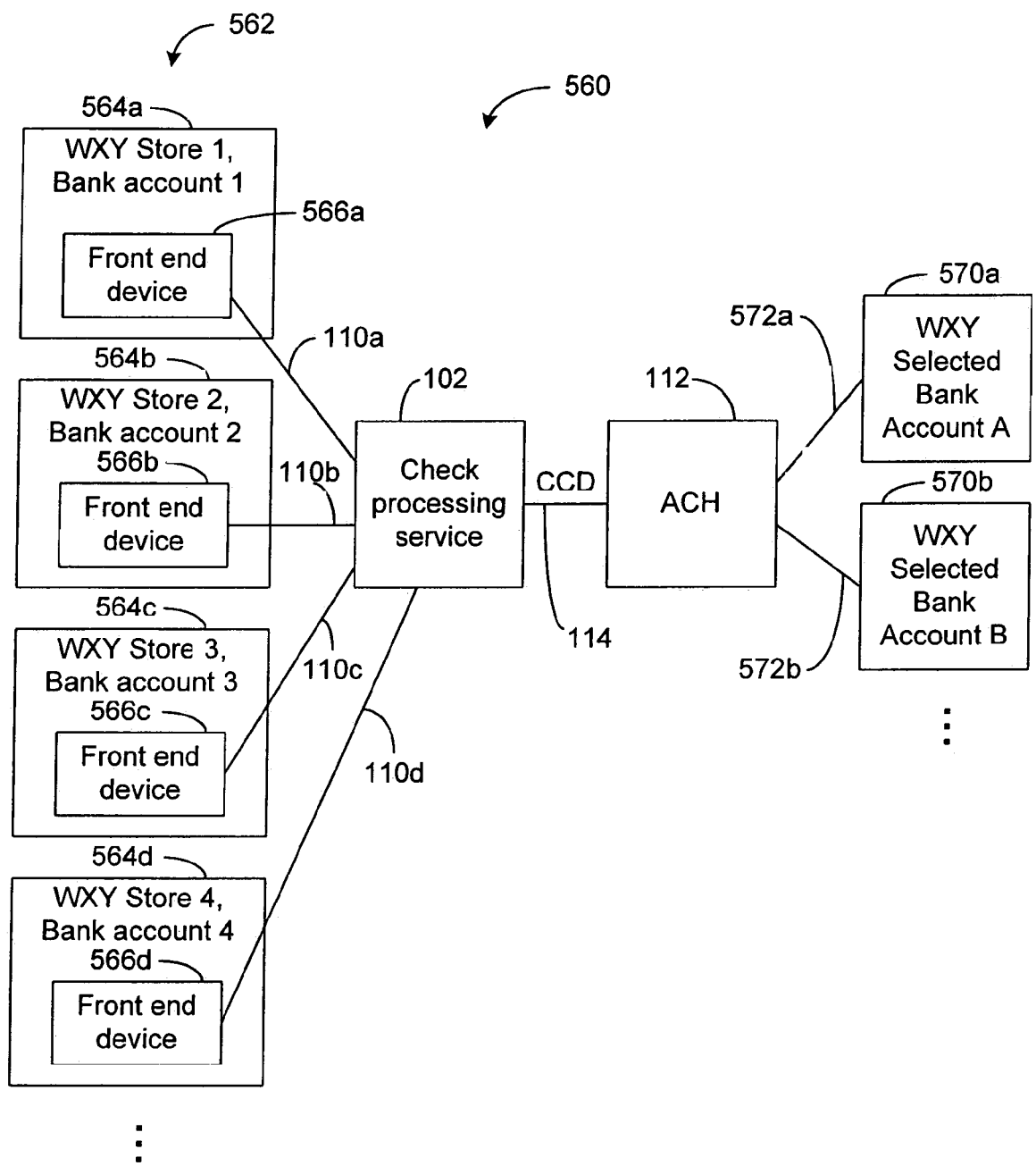
FIG. 6B illustrates an exemplary cash concentration disbursement (CCD) transaction that allows a subscribing merchant to select the manner in which funds are credited/debited with respect to selected bank accounts.
Figure 6C:
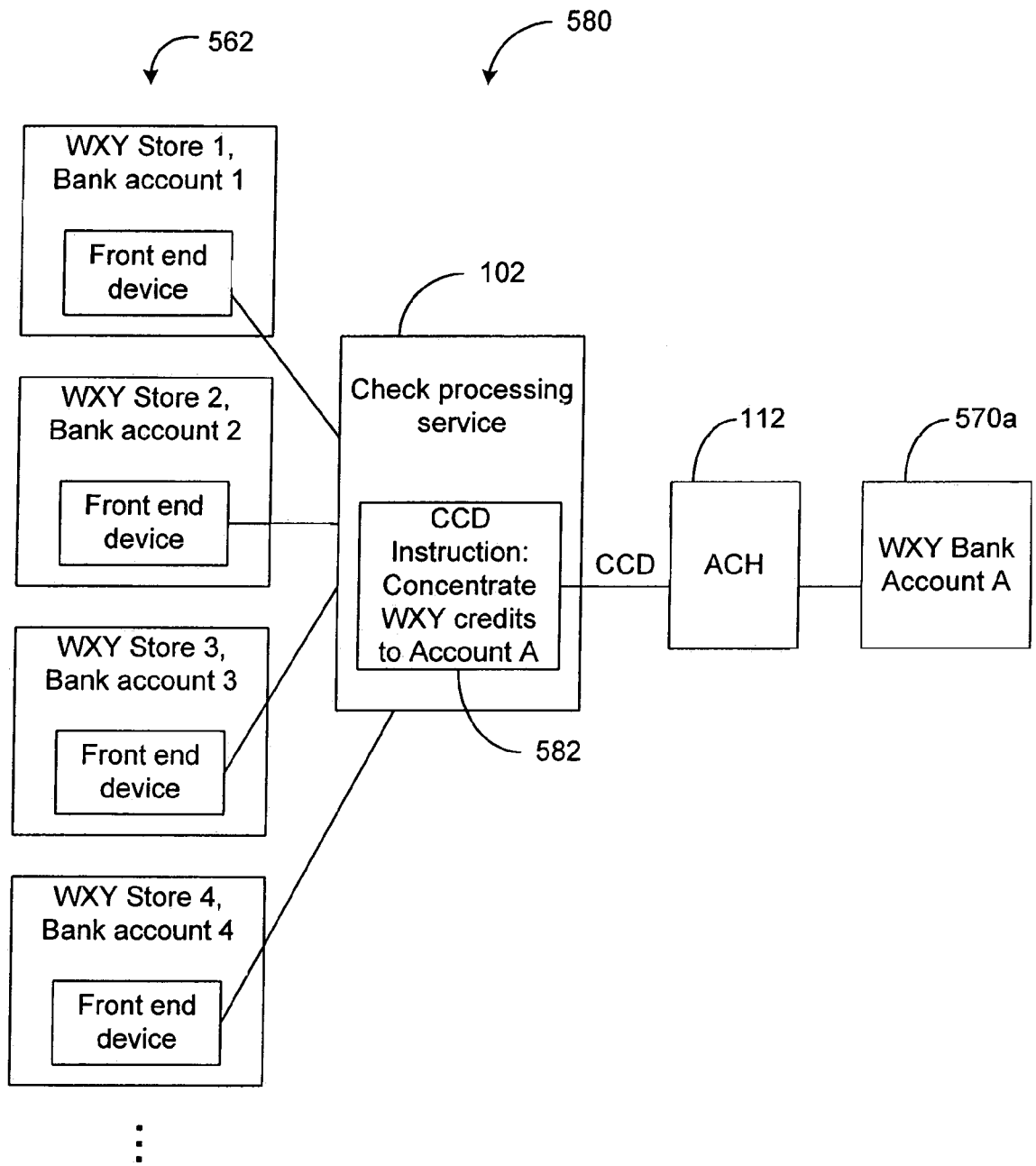
FIG. 6C illustrates an exemplary concentration of funds to a selected account vial the CCD transaction.

FIGS. 6B and 6C now illustrate in a simplified manner how a CCD transaction works and how it may provide an advantage to a subscribing merchant. As shown in FIG. 6B, an exemplary check transaction path. 560 comprises a subscribing merchant 562 having a plurality of exemplary stores 564. At least some of the stores 564 may be equipped with their own front end devices 566. The exemplary stores may be located at different geographic locations, and consequently, each store may utilize the services of a bank local to that particular store. Thus, for example, store "1" (564a) is depicted to be equipped with a front end device 566a, and has a local bank account "1."

As further shown in FIG. 6B, the plurality of front end devices 566 of the plurality of stores 564 are linked to the check processing service 102 via links 110. Such links may be under one or more subscription associated with the subscribing merchant 562. For the purpose of description, the four exemplary stores 564a–d are assumed to be capable of accepting and processing corporate checks in various manners described herein. The check processing service 102 processes the corporate check, also in manners described herein, and transfers the transaction to the ACH 112 as a CCD transaction via the link 114. The CCD transaction then allows the ACH 112 to credit (or debit) selected bank accounts 570 via links 572 as instructed by the check processing service 102. In certain implementations, the CCD transaction instruction as issued by the check processing service 102 may configurable by the subscribing merchant 562.

Thus, one can see that the CCD transaction allows the funds to be controlled and directed to a desired account in a more efficient manner than a non-CCD transaction. For example, in the non-CCD transaction, a check transaction from store "1" may be processed such that its local bank account "1" is first credited (or debited). Such a fund may then need to be transferred to the desired selected account(s) 570 by means such as a wire transfer.

FIG. 6C illustrates an exemplary cash concentration path that may be configured as desired by the subscribing merchant 562. In certain embodiments, the subscribing merchant's subscription to the check processing service 102 includes an instruction 582 that instructs how corporate check funds are to be directed. Thus, the exemplary instruction 582 is depicted to instruct the check processing service 102 to configure the subsequent routing so that the credits received from the plurality of stores are credited to account "A." The check processing service then includes such an instruction as part of the CCD transaction instruction to the ACH 112. The ACH 112 in response directs the credits to WXY's bank account "A" 570a, thereby concentrating the funds in that selected account in a more efficient manner.

It will be appreciated that a selected disbursement of funds may be performed in a similar manner as that described above in reference to FIG. 6C. Furthermore, although the exemplary CCD transactions are described in terms of crediting a selected account, it will be appreciated that debiting of selected account(s) may also be performed in a similar manner without departing from the spirit of the present teachings.

Figure 7A:
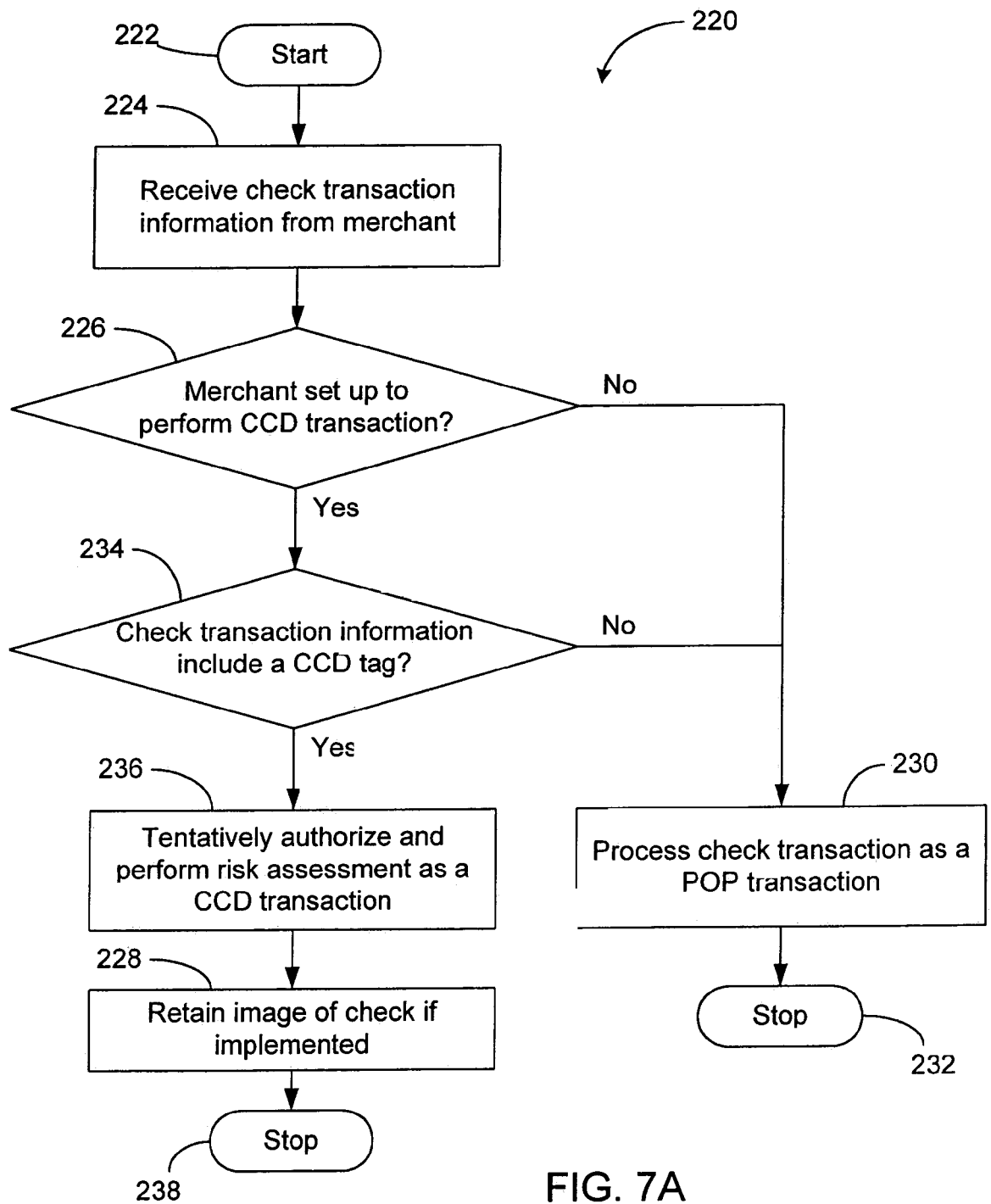
FIG. 7A illustrates a process for authorizing a corporate check transaction.

FIGS. 7A and B now illustrate processes 220 and 240 that preferably occur at the check processing service. The process 220 relates to one possible method of performing step 200 of the process 180 described above in reference to FIG. 6A. The process 240 relates to one possible method of performing step 206 of the process 180 described above in-reference to FIG. 6A.

As shown in FIG. 7A, the process 220 begins at a start state 222, and in step 224 that follows, the process 220 receives transaction data from a merchant. The process 220 then determines in step 226 whether the merchant is set up to perform CCD transactions. If the answer is "no," the process 220 processes the transaction data as a POP transaction in step 230, and the process 220 ends in a stop state 232 thereafter. If the answer is "yes," the process 220 in step 234 further determines whether the transaction data includes a CCD tag associated with the auxiliary on-us field information. If the answer is "no," the process 220 proceeds to steps 230 and beyond in a manner described above. If the answer is "yes," the process 220 in step 236 issues a first authorization and performs a risk assessment of the transaction data as a CCD transaction. In certain implementations of the process 220, the first authorization is a tentative authorization that can be superseded later by another authorize/decline decision based on the risk assessment. As previously described in reference to FIG. 6A, in certain implementations, the check transaction information can include the corporate check image (partial or full). Thus in certain implementations of the process 220, the check image is retained in step. 228 upon determination that the check transaction can proceed as a CCD transaction. The process 220 ends in a stop state 238.

Figure 7B:
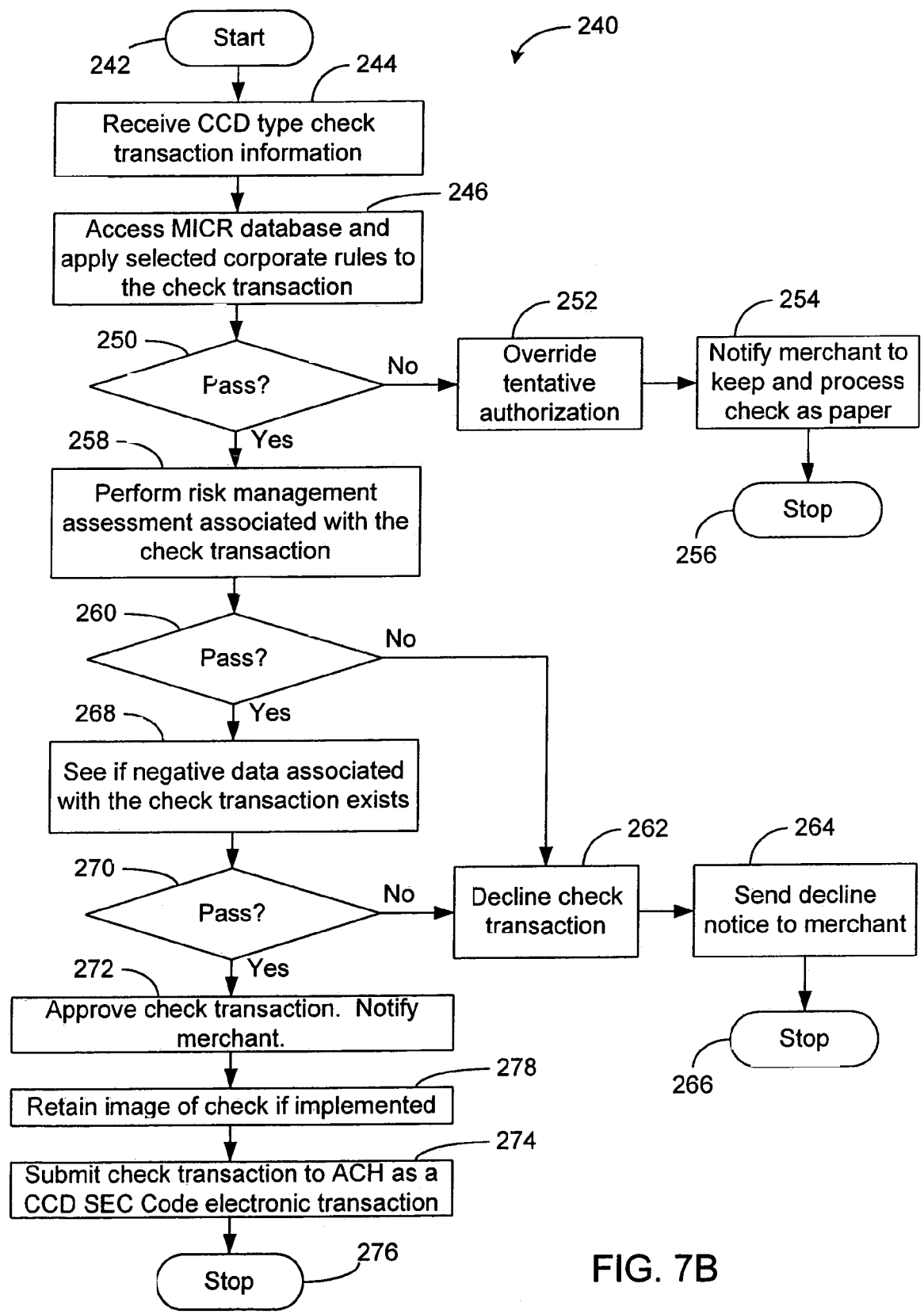
FIG. 7B illustrates a process for assessing a risk associated with the corporate check transaction.

As shown in FIG. 7B, the process 240 begins at a start state 242, and in step 244 that follows, the process 240 receives a CCD type transaction data. In step 246 that follows, the process 240 accesses a MICR database to obtain information about the MICR tag associated with the transaction data. The process 240, based on the information from the MICR database, applies selected corporate type rules to the transaction data to either pass or fail (or some other result therebetween) the transaction data for further processing.

In step 250 that follows, the process 240 determines whether the transaction data passes the MICR database/selected rule test. If the answer is "no," the process 240 in step 252 overrides, if any, an existing authorization (e.g., first authorization described above in reference to FIG. 7A). Then, the process 240 in step 254 notifies the merchant to keep and process the check as paper transaction. The process 240 then ends in a stop state 256.

If the answer is "yes" in step 250, the process 240 in step 258 performs a risk management assessment associated with the transaction data to either pass or fail (or some other result therebetween) the transaction data for further processing. The process 240 may access one or more databases to perform the risk assessment. In step 260 that follows, the process 240 determines whether the transaction data passes the risk assessment.

If the answer is "no" in step 260, the process 240 in step 262 declines the check transaction, and in step 264 that follows, the process 240 sends a decline notice to the merchant. In certain implementations, such a decline decision overrides the previous first authorization. Following the notification of the merchant in step 264, the process 240 ends in a stop state 266.

If the answer is "yes" in step 260, the process 240 proceeds to step 268 to determine if negative data associated with the transaction data exists. The process 240 may access one or more databases to perform such a determination: The process 240 in step 270 that follows, determines whether the transaction data passes the negative data test.

If the answer is "no" in step 270, the process 240 in steps 262 and beyond declines and notifies the merchant in a manner similar to that described above. If the answer is "yes" in step 270, the process 240 in step 272 approves the transaction data. In certain implementations, the process 240 sends a second authorization notice to the merchant. In other implementations, a notice may not be sent to the merchant at this stage, and the absence of a decline notice after the first authorization may function as a post-risk assessment authorization. As previously described in reference to FIGS. 6A and 7A, in certain implementations, the image (partial or full) of the corporate check may be obtained and retained. Thus in certain implementations, the process 240 retains the check image in step 278. The process 240 in step 274 submits the check transaction to ACH as an electronic CCD SEC Code transaction. The process 240 ends in a stop state 276.

FIGS. 8 to 13 now illustrate various embodiments and implementations of devices and processes that allow the merchant to accept and process corporate check related transactions. As described above in reference to FIGS. 5–7, information obtained from such a transaction allows the processing service to electronically process the transaction via the ACH.

Figure 8A:
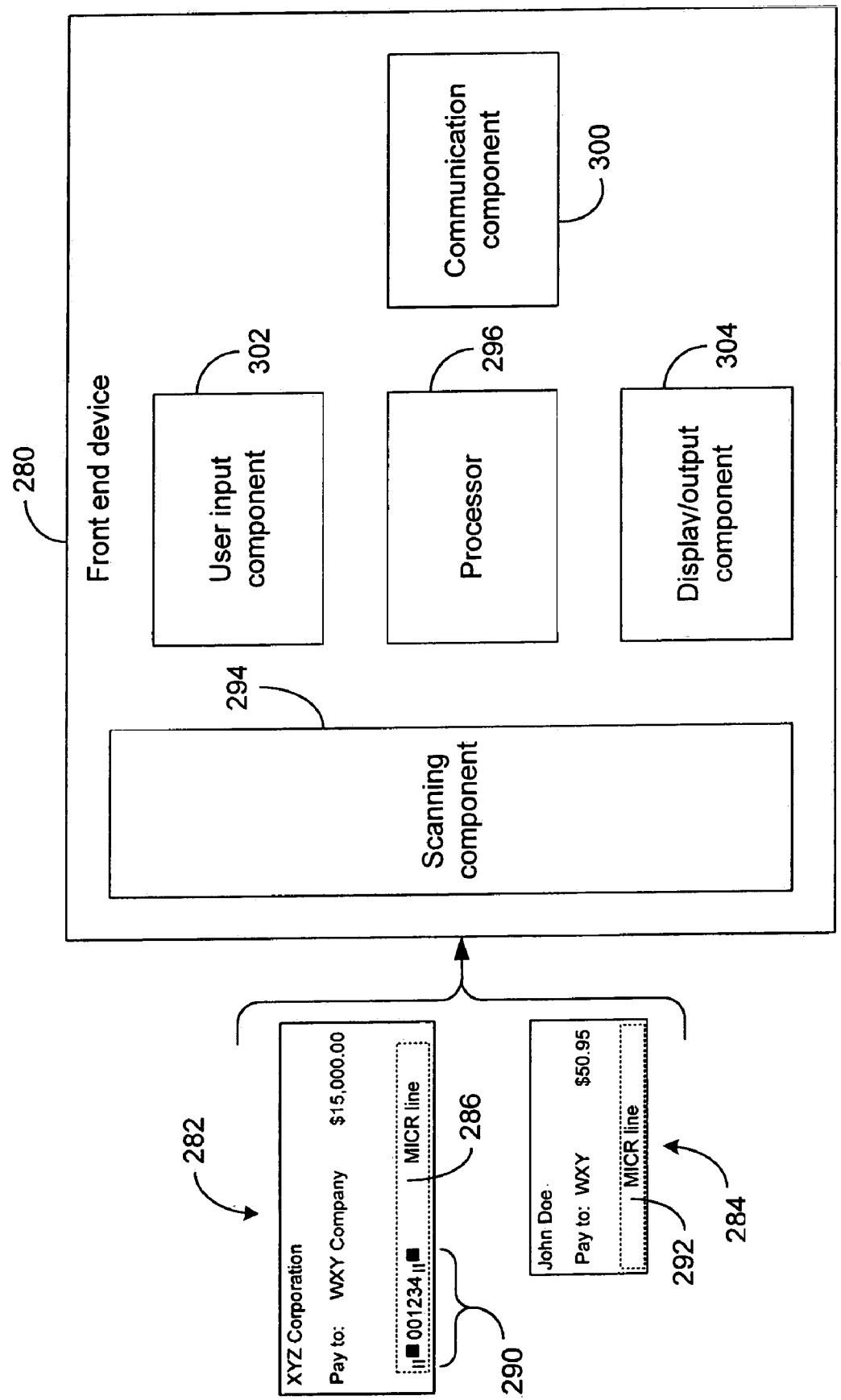
FIG. 8A illustrates a block diagram of a front end device adapted to scan checks and determine their types.

FIG. 8A illustrates a block diagram of one embodiment of a front end device 280 adapted to scan checks including an exemplary corporate check 282 and an exemplary non-corporate check 284. Corporate checks (sometimes also referred to as business checks) are typically printed on 8¾" stock paper, and non-corporate checks (usually referred to as personal checks) are typically printed on 6" stock paper. As is known in the art, some business checks are printed on the 6" stock. Thus for the purpose of description herein, terms "corporate checks" and "non-corporate checks" are used.

A typical check's MICR line using the popular E13-B MICR font includes a transit field bracketed by two transit symbols. The MICR line further includes an on-us field to the right of the transit field. The on-us field typically contains one on-us symbol to the right of the check's account number. In certain checks, the on-us field further includes a second set of numbers to the right of the on-us symbol. Typically on personal checks, the second set of numbers to the right of the on-us symbol of the on-us field denotes the check's serial number (check number).

As is generally known in the art, the on-us field denoted by the on-us symbol represents a sorting scheme as determined by an organization that will be performing such a sorting. Typically, such an organization is the bank that issued the check. Thus, they on-us field allows the check issuing bank to sort and manage the checks it issues. Consequently, the on-us field typically includes some combination of the check's account number and the serial number.

A corporate check further includes an auxiliary on-us field to the left of the transit field. The auxiliary on-us field is bracketed by two on-us symbols. Thus typically, corporate checks have two on-us symbols to the left of the transit field, and one on-us symbol to the right of the transit field. Non-corporate checks have no on-us symbol to the left, and one on-us symbol to the right of the transit field. Thus, one can see that there are a variety of ways of detecting and distinguishing corporate checks from non-corporate checks based on the number and/or locations of the on-us symbols. As an example, a detection of an on-us symbol to the left of the transit field may be indicative that the auxiliary on-us field is present and that the check is a corporate check.

As shown in FIG. 8A, the exemplary corporate check 282 includes an exemplary MICR line 286 and the MICR line 286 includes an exemplary auxiliary on-us field 290. The exemplary non-corporate check 284 includes an exemplary MICR line 292; however, that MICR line 292 does not have an auxiliary on-us field.

The exemplary checks described above can be scanned by the scanning front end device 280 comprising a scanning component 294 under the control of a processor 296. In general, it will be appreciated that the processors comprise, by way of example, computers, program logic, or other substrate configurations representing data and instructions, which operate as described herein. In other embodiments, the processors can comprise controller circuitry, processor circuitry, processors, general purpose single-chip or multi-chip microprocessors, digital signal processors, embedded microprocessors, microcontrollers and the like.

Furthermore, it will be appreciated that in one embodiment, the program logic may advantageously be implemented as one or more components. The components may advantageously be configured to execute on one or more processors. The components include, but are not limited to, software or hardware components, modules such as software modules, object-oriented software components, class components and task components, processes methods, functions, attributes, procedures, subroutines, segments of program code, drivers, firmware, microcode, circuitry, data, databases, data structures, tables, arrays, and variables.

As shown in FIG. 8A, the scanning front end device 280 further comprises a communication component 300 adapted to communicate transaction related information to and from the check processing service. The front end device 280 further comprises a user input component 302 adapted to receive input from the merchant and/or the customer to facilitate the processing of the check transaction. The front end device 280 further comprises a display/output component 304 that outputs information to the merchant and/or the customer to facilitate the check transaction.

Figure 8B:
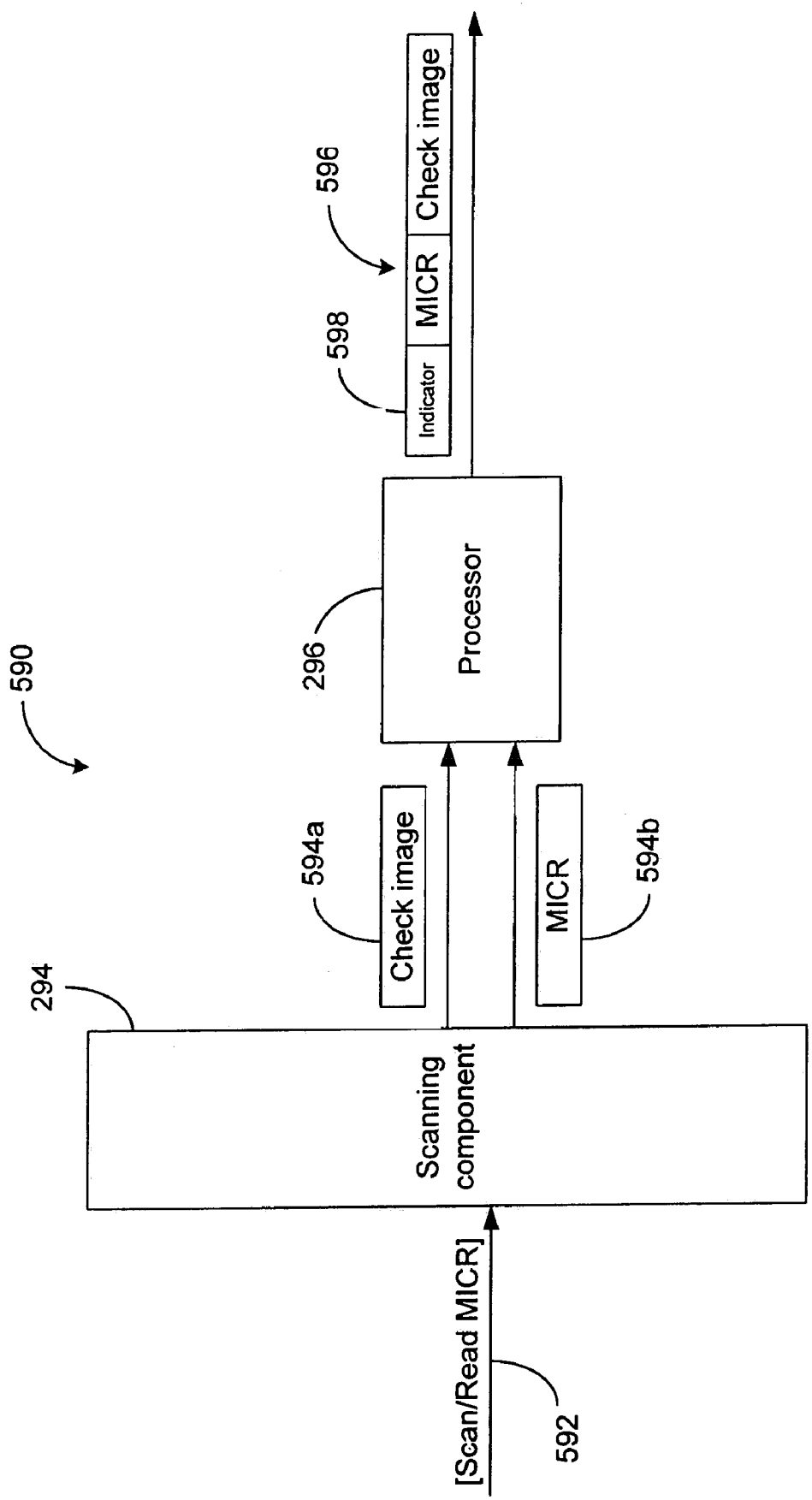
FIG. 8B illustrates an exemplary block diagram of how a check transaction data can be denoted to be a corporate check transaction.

FIG. 8B now illustrates an exemplary block diagram 590 of how an information obtained by the front end device (280 in FIG. 8A) can be denoted as a corporate check transaction. As previously described in reference to FIG. 8A, the scanning component 294, in one embodiment, scans the check and reads the check's MICR as indicated by an arrow 592. Such an operation may result in a data packet 594a associated with the check image (substantially full or in snippets), and a data packet 594b associated with the check's MICR information. It will be understood that such exemplary data packets 594a, b may exist as a singular data packet, or in any of a number of different possible formats without departing from the spirit of the present teachings.

As shown in FIG. 8B, the processor 296 is depicted to receive the data packets 594a and b and output a check transaction data 596 that may include the check image and the MICR information. The processor 296 may also append an indicator 598 that denotes that the check transaction data 596 is a corporate check transaction. It will be appreciated that the indicator 598 that denotes the check transaction as a corporate transaction can be implemented in a number of ways. For example, the indicator may comprise a block of data appended to the check transaction data 596 in a recognizable manner. Such a block of data may comprise the information obtained from the auxiliary on-us field, or may comprise any form of data whose presence indicates that the indicator 598 is present in the check transaction data 596. Alternatively, the indicator may be implemented as a switch type indicator. For example, the indicator may comprise a simple status bit that is part of the check transaction data 596, and the status bit being "on" may indicate a corporate check transaction.

The exemplary check transaction data 596 formed in the foregoing manner can be transferred to the communication component (300 in FIG. 8A) that in turn communicates it to the check processing service (not shown). The exemplary denotation of the check transaction data by the processor 296 can also be utilized to trigger a selected generation of a receipt that depends on the type of the check transaction. Such selected receipt feature is described below in greater detail.

Figure 9B:
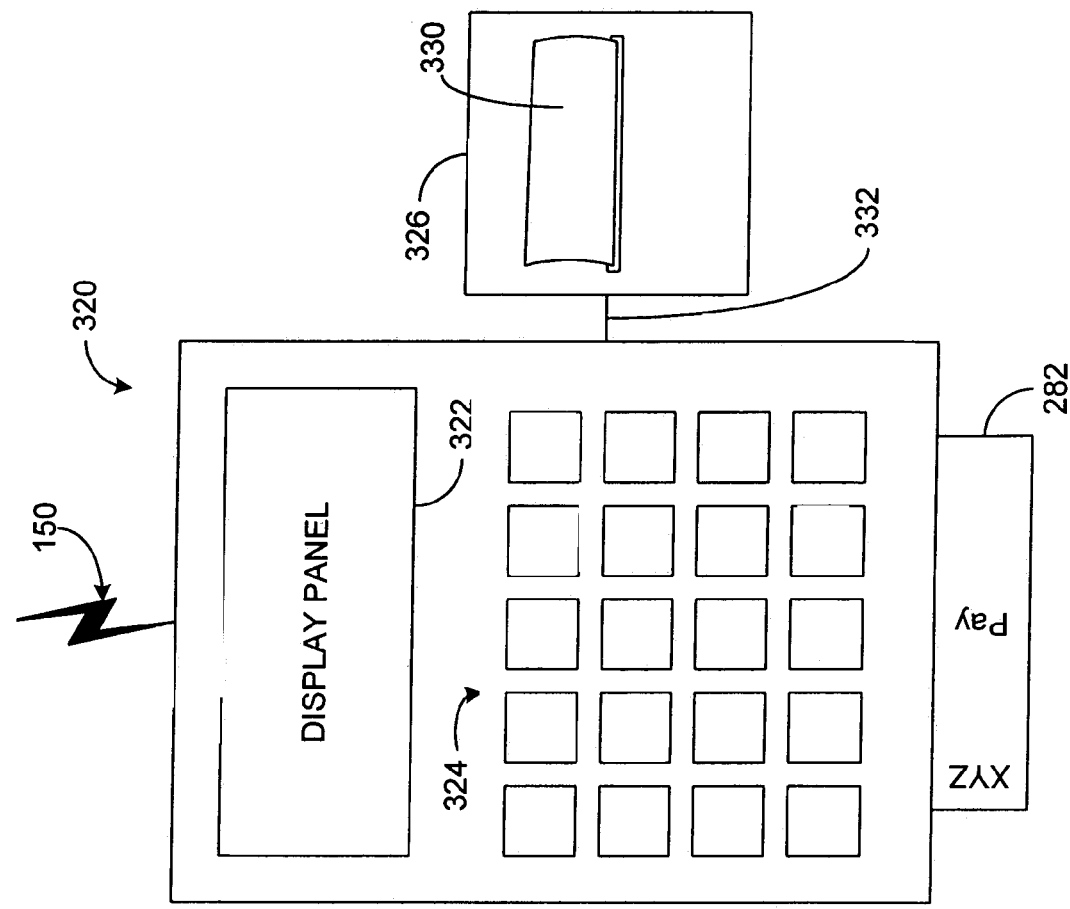
FIG. 9B illustrates another embodiment of a check scanner linked to a receipt printing device to allow generation of a hardcopy receipt.
Figure 9A:
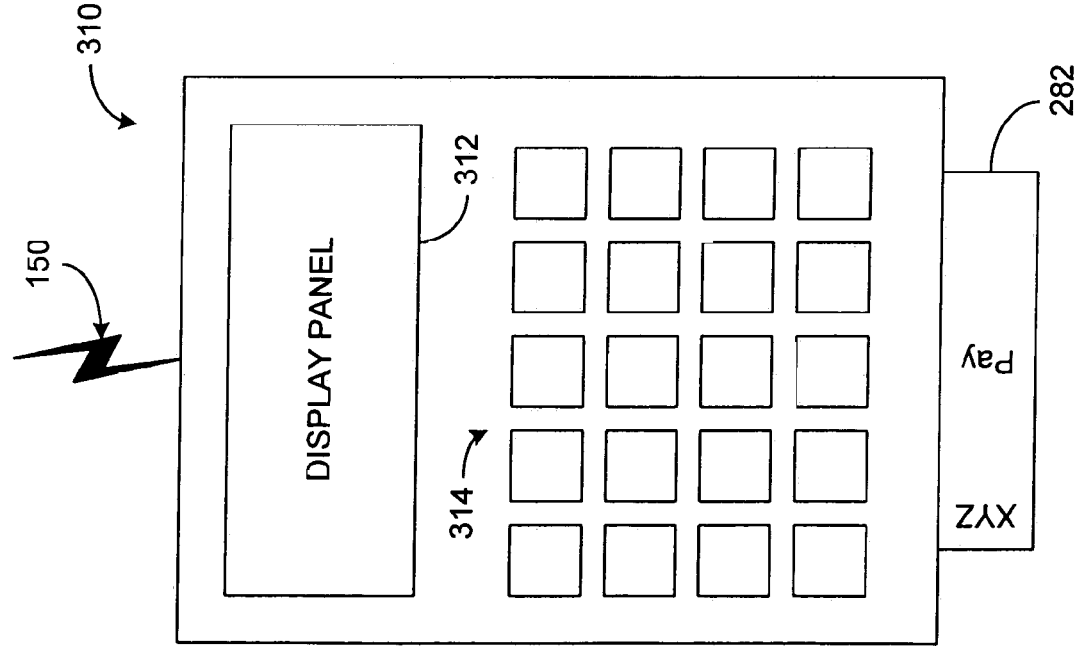
FIG. 9A illustrates one embodiment of a check scanner having a display panel that can display a receipt message specific for the type of check scanned.
Figure 9C:
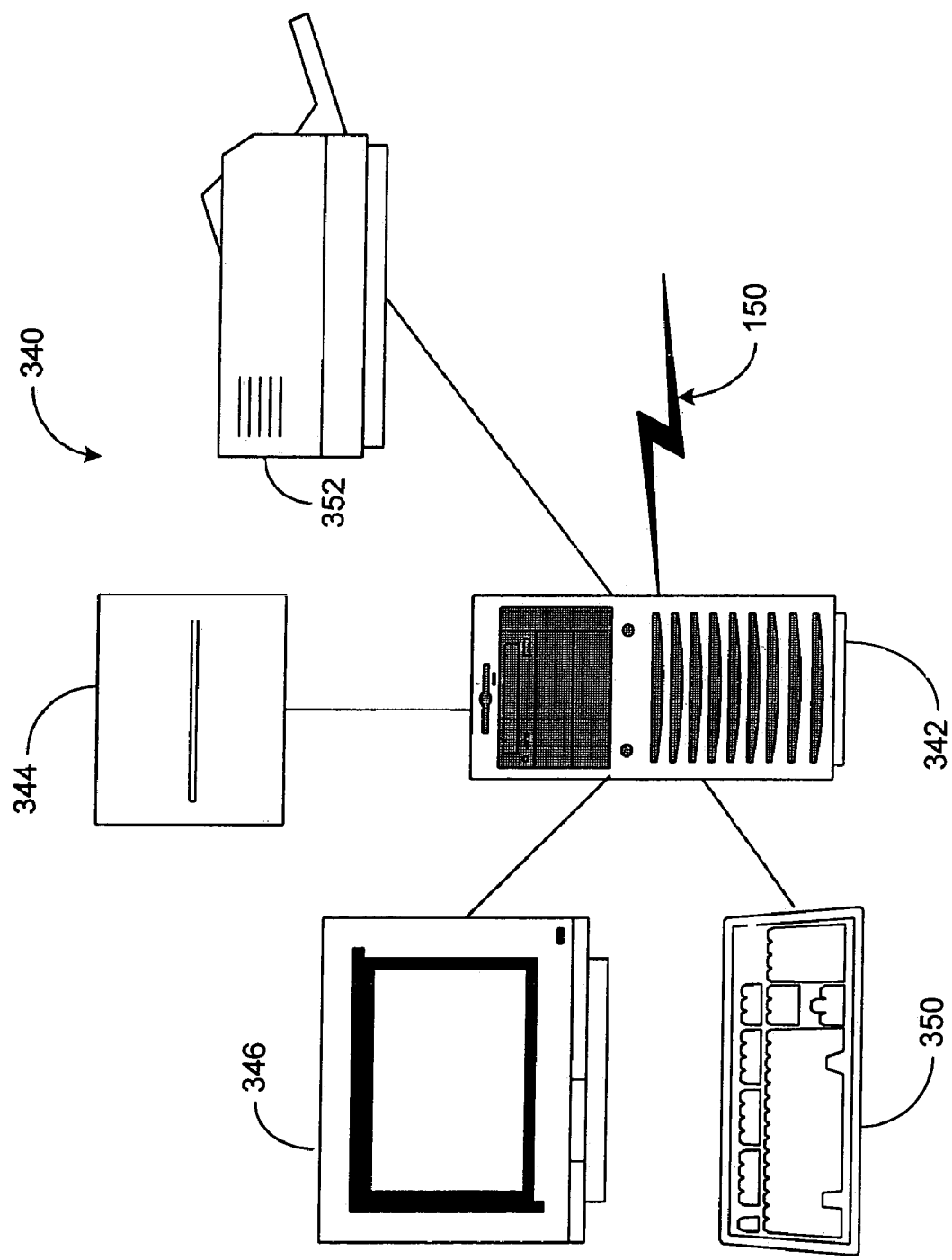
FIG. 9C illustrates another embodiment of a check scanning system based on a computing device.

FIGS. 9A–C now illustrate some exemplary embodiments of the front end device described above in reference to FIG. 8A. FIG. 9A illustrates an integrated check scanning device 310 found at many POP locations. The check scanning device 310 typically comprises a display panel 312 and a keypad 314 that facilitate user-friendliness of the device 310 while performing a transaction. One function of the display panel 312 may be to display a receipt message upon receipt of a check. One function of the keypad 314 may be to allow the customer to acknowledge the reading of the receipt message displayed on the display panel 312. The check scanning device 310 is also depicted to be linked to the processing service (not shown) via the communication link 150.

In one aspect, the present teachings relates to the check scanning device 310 configured to scan corporate checks 282. In particular, the check scanning device 310 detects the auxiliary on-us field on the corporate check 282 and performs the transaction based on such a detection. In certain embodiments, the check scanning device 310 may be configured to allow scanning of both the corporate check 282 and the non-corporate check (not shown). Consequently, the check scanning device 310 may be configured to distinguish the corporate check from the non-corporate check based on the presence or absence of the auxiliary on-us field.

FIG. 9B illustrates a similar check scanning device 320 adapted to scan the corporate check 282 (and the non-corporate checks in some embodiments) coupled to a printing device 326 via a link 332. The link 332 may be wire based, or may be wireless. The printing device 326 is adapted to print out a receipt 330 in response to scanning of a check. The receipt 330 may include language that reflects the corporate check nature of the transaction. In certain embodiments, the receipt may also be printed to include language appropriate for the non-corporate check.

As with the embodiment described above in reference to FIG. 9A, certain embodiments of the check scanning device 320 may be configured to detect the auxiliary on-us field on the corporate check 282 and performs the transaction based on such a detection. In certain embodiments, the check scanning device 320 may be configured to allow scanning of both the corporate check 282 and the non-corporate check (not shown). Consequently, the check scanning device 320 may be configured to distinguish the corporate check from the non-corporate check based on the presence or absence of the auxiliary on-us field. Furthermore, as shown in FIG. 9B, certain embodiments of the check scanning device 320 may include a display panel 322 and a keypad 324 that facilitate user-friendliness of the device 320 while performing a transaction. Also, the check scanning device 320 is also depicted to be linked to the processing service (not shown) via the communication link 150.

FIG. 9C illustrates a check scanning assembly 340 that facilitates scanning and processing of a check. In particular, the assembly 340 may be configured to scan corporate checks and non-corporate checks, and distinguish these two types of checks based on the presence or absence of the auxiliary on-us field, thereby allowing subsequent processing of the differentiated checks in a manner disclosed herein.

As shown in FIG. 9C, the check scanning assembly 340 may comprise a detached check scanning component 344 linked to a computer 342. The computer 342 may be configured to induce check scanning, take selected actions based on the scan, and communicate with the processing service via the communication link 150. The check scanning assembly 340 may further comprise a display terminal 346 and a keyboard 350 that facilitate the scanning and processing of the check in a manner similar to that of the display panels and keypads described above in reference to FIGS. 9A and B. Also similar to the check scanning device 320 of FIG. 9B, the check scanning assembly 340 may comprise a printer 352 that can print out a receipt having language specific for the type of check being scanned and processed.

Figure 9D:
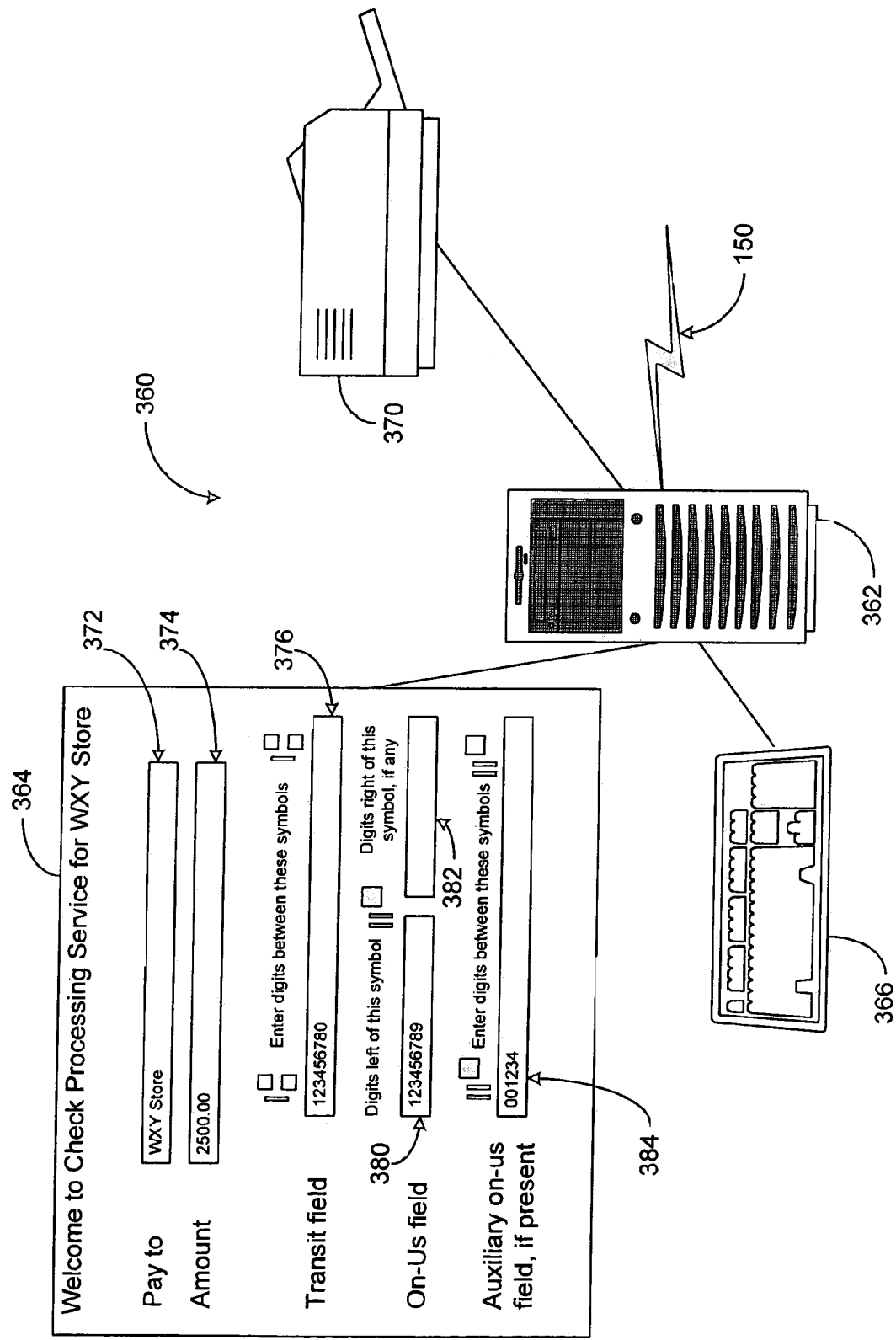
FIG. 9D illustrates an embodiment of a computing device configured to conduct electronic transactions involving corporate checks.
Figure 9E:
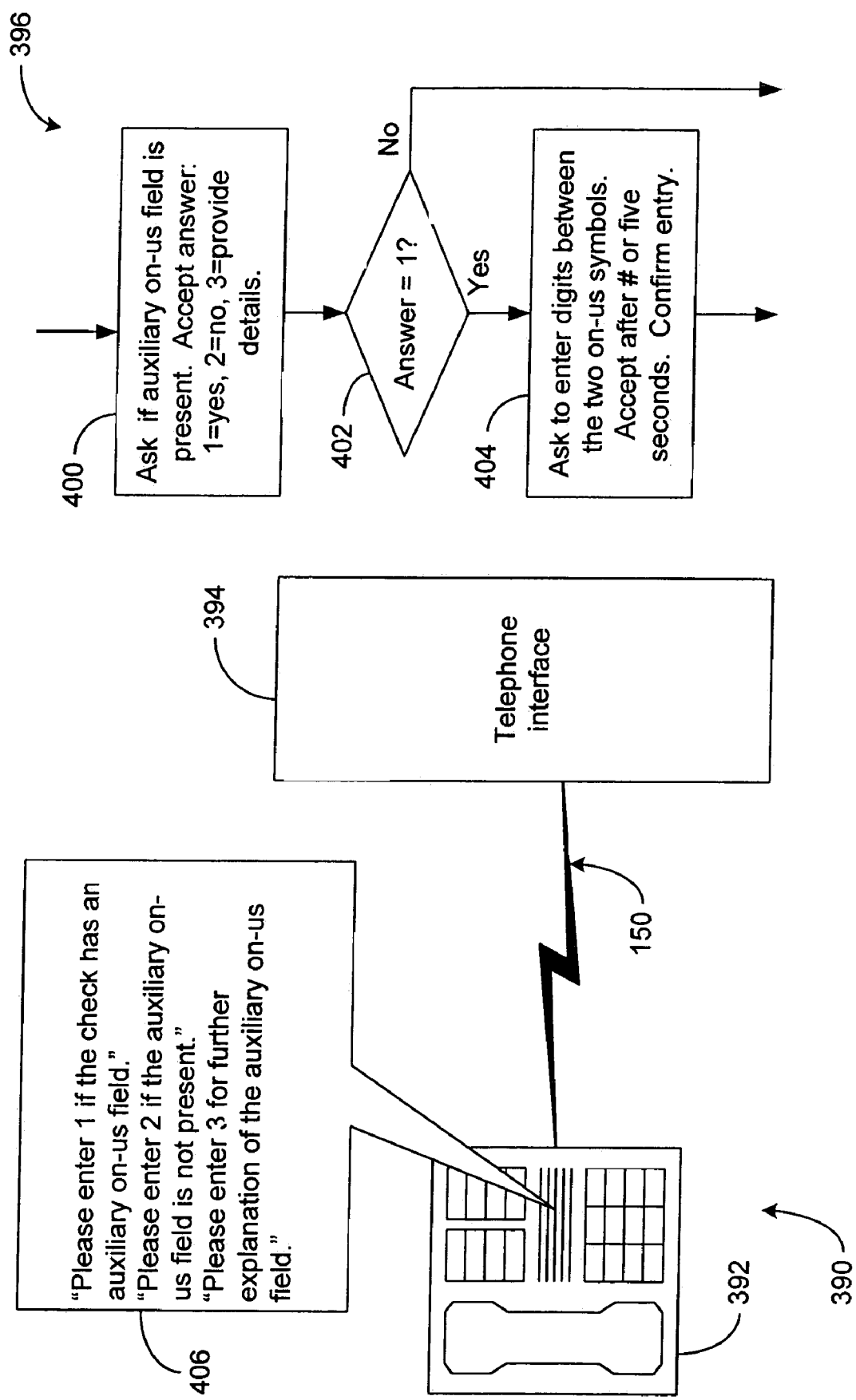
FIG. 9E illustrates a telephone based system configured to conduct electronic transactions involving corporate checks.

Thus, as seen in FIGS. 9A–C, the check scanning and processing at a location associated with the merchant can be performed in various different embodiments of scanning based systems. FIGS. 9D–E now illustrate how the check related transactions can also be conducted via systems that are not scanning based. As an example, FIG. 9D illustrates an exemplary check transaction processing system 360 that can be located at a location associated with the merchant. The exemplary system 360 comprises a computing device 362 configured to cause a display 364 to be displayed to facilitate the check related transaction. The exemplary display 364 may be displayed on a terminal located at the location associated with the merchant. The exemplary display 364 may also be displayed on a terminal associated with a customer conducting a check related transaction via a network such as the Internet. Thus, it will be appreciated that the exemplary display 364 may be displayed at any location without departing from the spirit of the present teachings.

As shown in FIG. 9D, the exemplary display 364 depicts a plurality of input prompts, including a "pay to" field 372, an amount field 374, a transit field 376 associated with the customer's check, on-us field(s) 380 (and sometimes 382), and an auxiliary on-us field 384. As described herein, a corporate check includes the auxiliary on-us field, whereas a non-corporate check typically does not. As such, an entry in the auxiliary on-us field input 384 may be used as an indicator that the check being processed is a corporate check. Conversely, an absence of an entry in the auxiliary on-us field input 384 may be used as an indicator that the check being processed is a non-corporate check. Because the presence or absence of the auxiliary on-us field input 384 is typically entered by a human operator, thus possibly being susceptible to human error, additional logic may be implemented to confirm the check as a corporate or a non-corporate check. As an example, a typical personal check includes the check's serial number to the right of the on-us symbol in the on-us field (in the input prompt 382 in FIG. 9D), whereas a corporate check typically does not. Consequently, presence or absence of an input in the input prompt 382 may be used in conjunction with the auxiliary on-us field input 384 to facilitate the manner in which a corporate check transaction is distinguished from a non-corporate check transaction.

As shown in FIG. 9D, the computing device 362 may be linked to a keyboard to facilitate the check related transaction. The computing device 362 may also be linked to a printer 370 to facilitate generation of a receipt in a manner described herein. Furthermore, the computing device 362 is linked to a check processing service via the communication link 150 also described herein.

FIG. 9E illustrates another non-scanning based check transaction processing system. In particular, the exemplary system illustrated in FIG. 9E is a telephone based system 390 that may be located at a location associated with the merchant or the customer. The telephone based system 390 comprises a telephone 392 linked to a telephone interface 394 that may be located at a location associated with the merchant, or be a part of the check processing service. The telephone interface 394 may be configured to convert information derived from the telephone based transaction into other electronic format so as to facilitate subsequent electronic processing of the check related transaction.

As shown in FIG. 9E, the telephone interface 394 may be configured to execute an exemplary process 396, part of which is shown for descriptive purpose. In step 400, the process 396 may induce the telephone interface 394 to ask via the telephone 392 if an auxiliary on-us field is present on a check that the transaction is based upon. The process 396 then detects an answer from the telephone 392.

On the telephone end, step 400 of the exemplary process 396 may be presented as an exemplary instruction 406 depicted in FIG. 9E. Thus, a user performing the telephone based transaction may choose to press the exemplary choices "1" or "2" based on the presence or absence of the auxiliary on-us field on the check. It will be appreciated that the interaction between the user and the telephone interface 394 may be facilitated by any number of other known implementations. For example, the user can input an exemplary response by either pressing the "1" button, or by saying "one." In another example, the telephone interface 394 may be configured to communicate with a Telecommunication Device for the Deaf (TDD) that allows people who are deaf, hard of hearing, or speech-impaired use the telephone to communicate. In such a communication configuration, the exemplary instruction 406 may be in the form of a displayed message instead of a sound-based message.

As further shown in FIG. 9E, the exemplary process 396, upon receipt of a response from the user, determines in step 402 whether the value of the answer is a "1." If "no," the process 396 treats the check transaction as a non-corporate type transaction. If "yes," then the process in step 404 prompts the user to enter digits between the two on-us symbols. Such an entry may be terminated by pressing the "#" key, or after passing of a predetermined duration after the last digit entry. In certain implementations the process 396 may confirm the entry of the auxiliary on-us field.

In certain implementations, the process 396 may omit the entering of the auxiliary on-us field. As is known in the art, the auxiliary on-us field typically contains the check's serial number. In certain transactions, such information may not be necessary; thus, obtaining such information from the user may be omitted.

The process 396, following the determination of the presence of the auxiliary on-us field (and possibly obtaining of the field), proceeds to perform the transaction as a corporate check type transaction. Thus from the exemplary scanning based and non-scanning based devices and systems in FIGS. 9A–E, it will be appreciated that a corporate check or check information can be distinguished from that of a non-corporate check or check information in a number of ways.

Figure 10A:
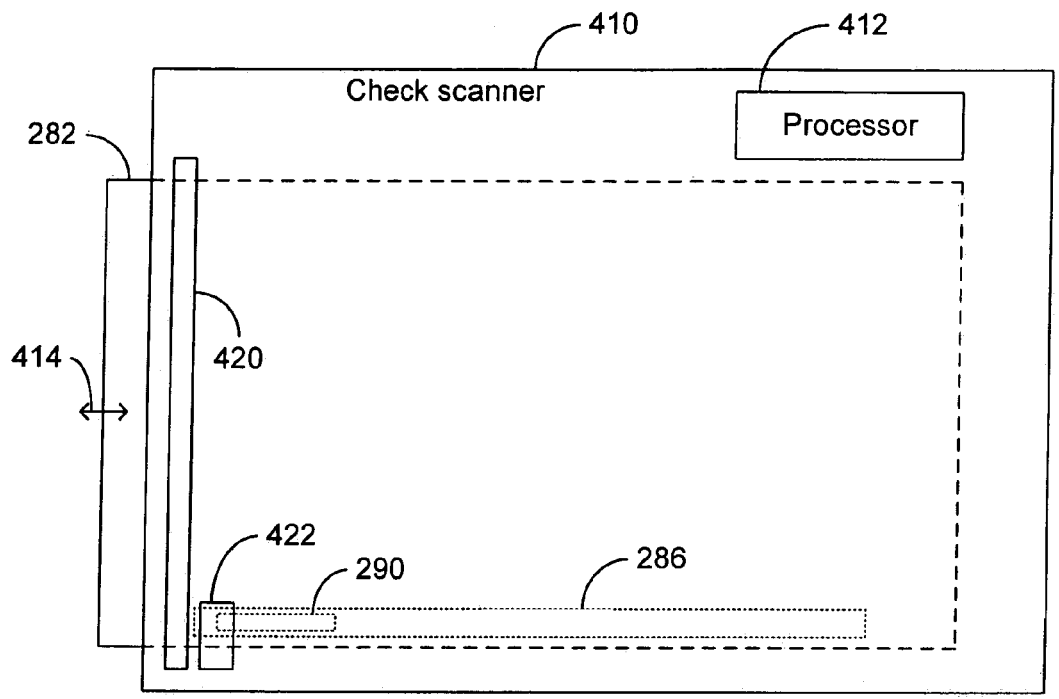
FIGS. 10A and B illustrate one embodiment of a check scanning device configured to distinguish a corporate check from a non-corporate check.
Figure 10B:
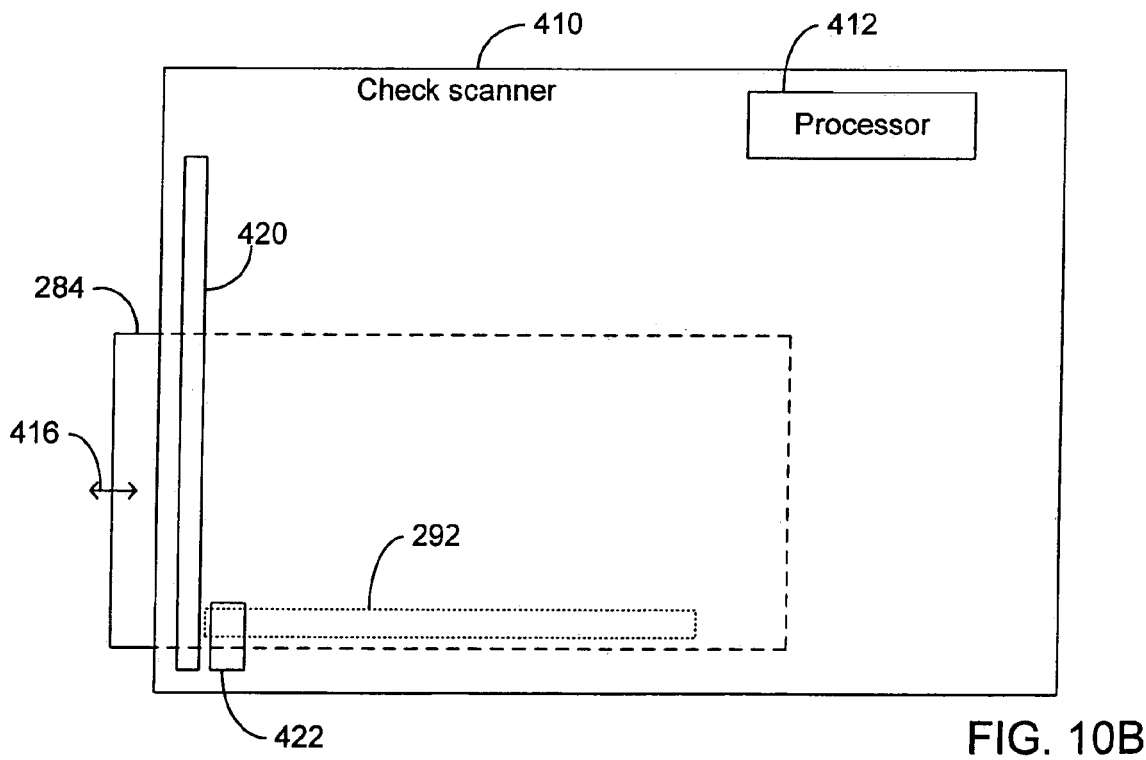
Figure 11:
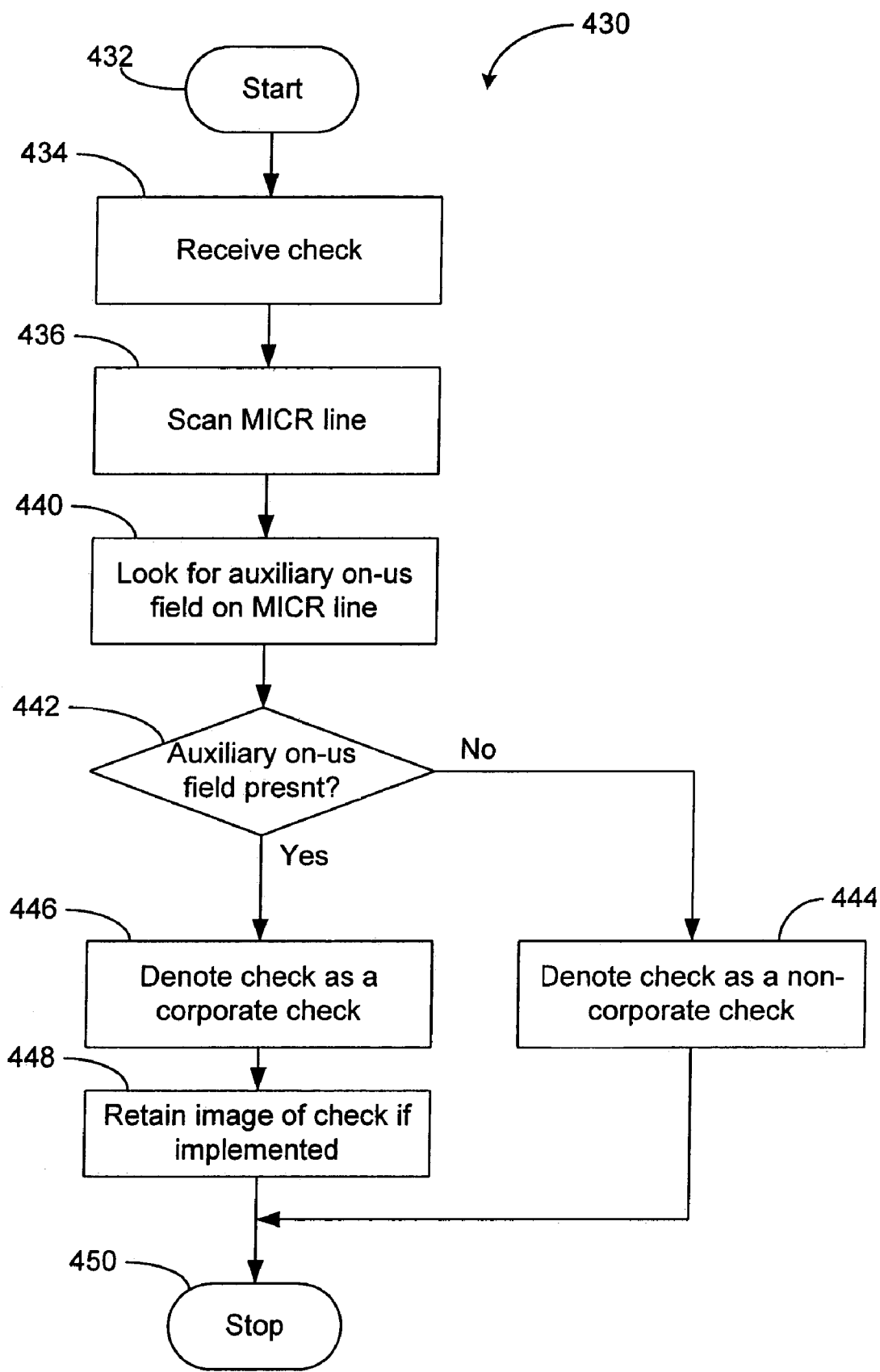
FIG. 11 illustrates one possible process for distinguishing a corporate check from a non-corporate check.

FIGS. 10 and 11 now illustrate in greater detail how a merchant based device (front end device) can be configured to distinguish a check as a corporate check or a non-corporate check based on the scanning of the check. As shown in FIGS. 10A and B, the merchant based device may comprise a check scanner 410 configured to allow scanning of both the corporate check 282 and the non-corporate check 284 described above in reference to FIG. 8A.

In FIG. 10A, the check scanner 410 is depicted as scanning (indicated by an arrow 414) the corporate check 282. Such scanning may be facilitated by a scan head 420, and the scanned image of the check may comprise a substantially full image of the check 282 or snippets of selected areas of the check 282.

As further shown in FIG. 10A, the check scanner 410 is depicted as capturing the MICR line 286 of the corporate check 282 via a MICR reader 422. As is described herein, the MICR line 286 of the corporate check 282 typically includes the auxiliary on-us field 290. Thus, the scanning of the check (or snippets of the check) and reading of the MICR line allows the scanned check to be determined as a corporate check or a non-corporate check, and subsequently processed accordingly.

As shown in FIG. 10B, the check scanner 410 may also scan (depicted as arrow 416) the non-corporate check 284 using the scan head 420 and read the MICR line 292 using the MICR reader 422. As further shown in FIGS. 10A and B, the scanning of the check and reading of the MICR line may be controlled by a processor 412.

The processor may further be configured to process the scanned check image and/or the read MICR line. FIG. 11 illustrates one possible implementation of a process 430 that scans the check and determines if the scanned check is a corporate check or not. The process 430 begins in a start state 432, and in step 434 that follows, the process 430 induces the check scanner to receive a check. In step 436 that follows, the process 430 induces reading of the MICR line. In step 440 that follows, the process 430 then searches for an auxiliary on-us field in the read MICR line.

In a decision step 442 that follows, the process 430 determines whether the auxiliary on-us field is present. If "no," the process 430 in step 444 denotes the scanned check as a non-corporate check. If "yes," the process 430 in step 446 denotes the scanned check as a corporate check. In certain implementations, as previously described in reference to FIG. 6A, the check may be imaged (partially or fully) upon determination that it is a corporate check. Thus in certain implementations, the process 430 can in step 448 induce imaging of the check. The process 430 ends at a stop state 450.

By having a merchant-associated device (at the location associated with the merchant) configured to distinguish a corporate check from a non-corporate check, some advantageous features may be implemented to improve the manner in which corporate checks are accepted and processed. One aspect of the present teachings relates to systems and methods of determining, at the merchant-associated location, whether the check or check related transaction involves a corporate check. In response to such a determination, the merchant-associated device may be configured to generate different receipts for the different types of checks. In particular, the merchant-associated device may be configured to generate a receipt for a corporate check or corporate check related transaction, or a receipt for a non-corporate check or a non-corporate related transaction.

Figure 12A:
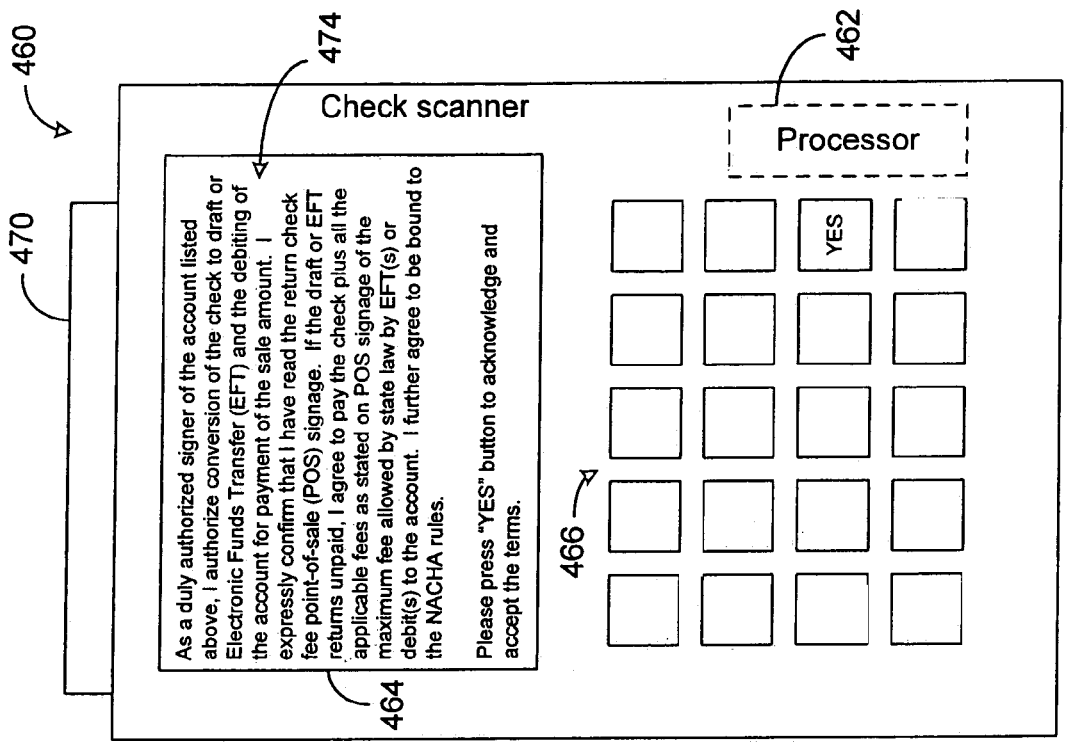
FIG. 12A illustrates one embodiment of a check scanner configured to display a corporate receipt upon scanning and detection of a corporate check.

FIGS. 12A and B illustrate two exemplary embodiments of a check scanner configured to generate a corporate receipt in response to scanning of a corporate check. As previously described in reference to FIGS. 10 and 11, such a check scanner may be configured to scan both corporate checks and non-corporate checks.

FIG. 12A illustrates one embodiment of a check scanner 460 having a display panel 464 and a processor 462. The processor 462, in response to detection of a corporate check 470, induces displaying of a receipt 474 having language specific for corporate transactions. The customer may then be prompted to acknowledge and accept the terms of the receipt 474 by performing a certain operation, such as pressing a "YES" button on a keypad 466.

Figure 12B:
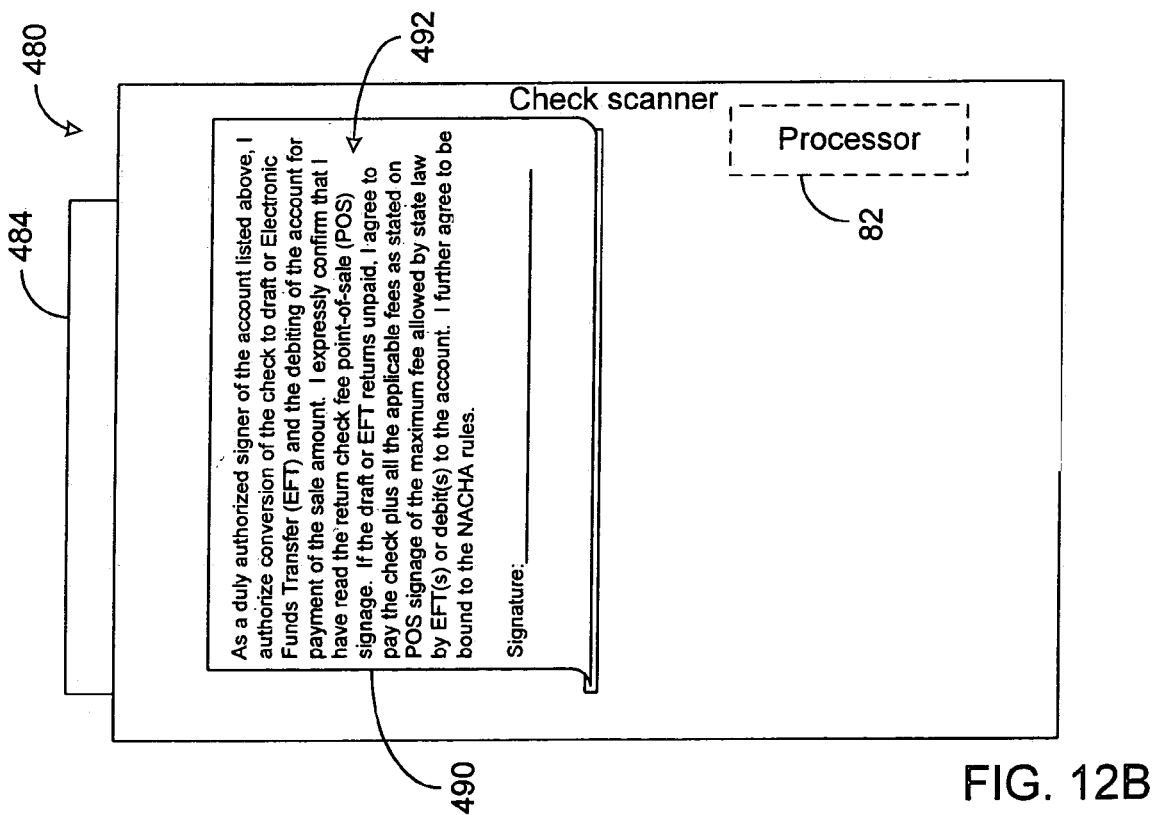
FIG. 12B illustrates another embodiment of a check scanner configured to print a corporate receipt upon scanning and detection of a corporate check.

FIG. 12B illustrates another embodiment of a check scanner 480 adapted to generate a hardcopy receipt 490. The paper receipt 490 may have imprinted on it language 492 specific for corporate transactions. The customer may then acknowledge and accept the terms of the receipt 490 by signing on a signature block provided. Similar to the check scanner 460 of FIG. 12A, the check scanner 480 may be configured to generate the appropriate receipt in response to the type of a check 484 being scanned under the control of a processor 482.

As shown in FIGS. 12A and B, one of many possible receipt languages may comprise an exemplary language such as: "As a duly authorized signer on the account listed above, I authorize conversion of the check to draft or Electronic Funds Transfer (EFT) and the debiting of the account for payment of the sale amount. I expressly confirm that I have read the return check fee point-of-sale (POS) signage. If the draft or EFT returns unpaid, I agree to pay the check plus all applicable fees as stated on the POS signage or the maximum fee allowed by state law by EFT(s) or debit(s) to the account. I further agree to be bound to the NACHA rules." It will be appreciated that such an exemplary receipt language can be modified in any number of ways without departing from the spirit of the present teachings.

Figure 13:
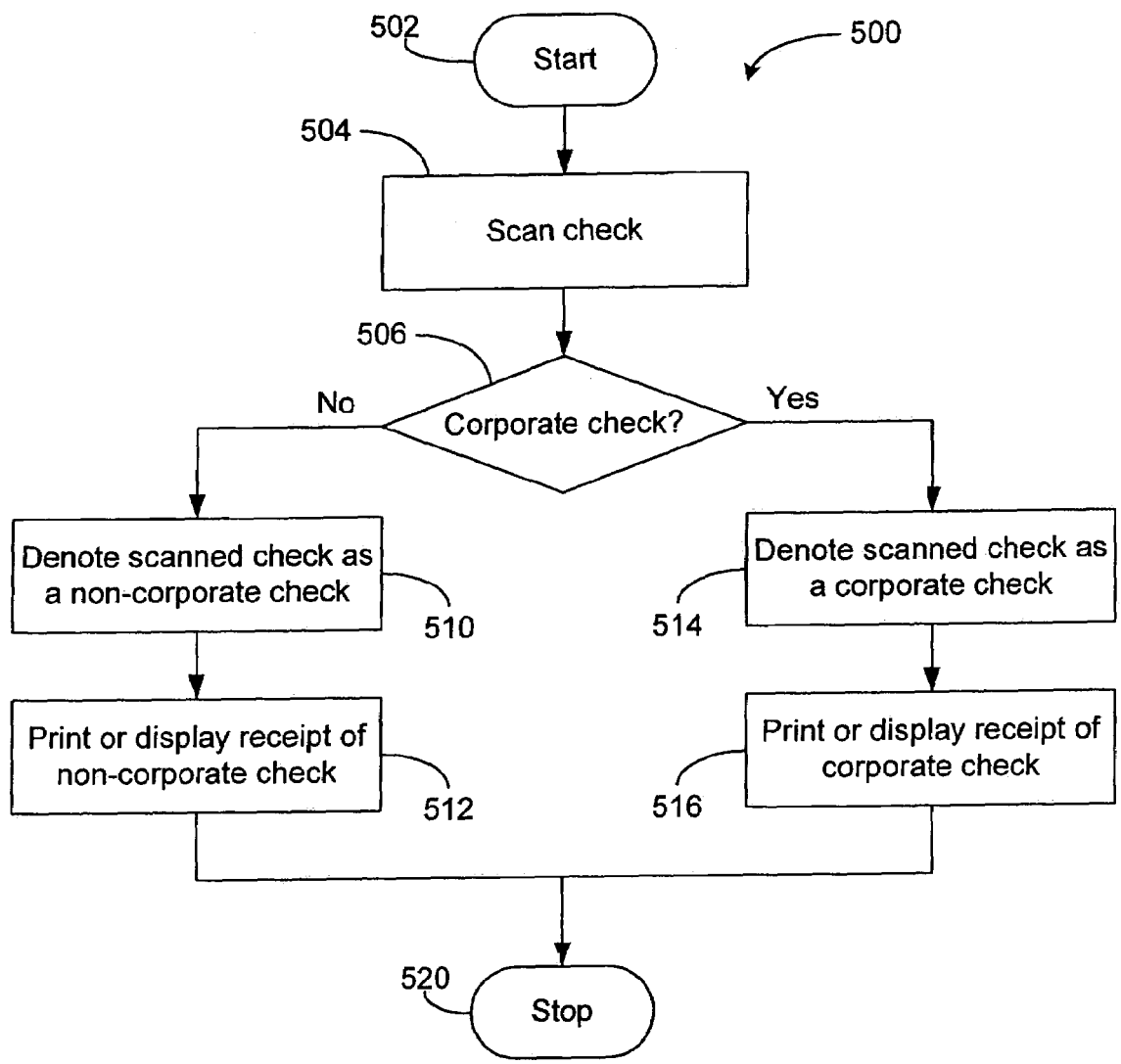
FIG. 13 illustrates one possible process for generating a corporate receipt or a non-corporate receipt based on the determination of the check type via scanning.

In certain embodiments, the exemplary processors 462 and 482 of FIGS. 12A and B are configured to distinguish the types of checks scanned and generate different types of receipts depending on the type of the checks. One such process 500 is illustrated in FIG. 13. The process 500 begins at a start state 502, and in step 504 that follows, the process 500 induces scanning of a check. In a decision step 506 that follows, the process determines whether the scanned check is a corporate check. In certain implementations, such a determination is based on the presence or absence of the auxiliary on-us field in a manner described above.

If the answer in step 506 is "no," the process 500 in step 510 denotes the scanned check as a non-corporate check. In step 512 that follows, the process 500 induces printing or displaying of a receipt for non-corporate checks. If the answer in step 506 is "yes," the process 500 in step 514 denotes the scanned check as a corporate check. In step 516 that follows, the process 500 induces printing or displaying of a receipt for corporate checks. The process 500 ends at a stop state 520.

Although the above-disclosed embodiments of the present invention have shown, described, and pointed out the fundamental novel features of the invention as applied to the above-disclosed embodiments, it should be understood that various omissions, substitutions, and changes in the form of the detail of the devices, systems, and/or methods illustrated may be made by those skilled in the art without departing from the scope of the present invention. Consequently, the scope of the invention should not be limited to the foregoing description, but should be defined by the appended claims.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

What is claimed is:

1. A method of electronically processing a check comprising:
    scanning a check received by a merchant at a merchant location to obtain information about the check that facilitates electronic processing of the check wherein the information about the check includes a magnetic ink character recognition (MICR) line imprinted on the check;
    determining that the check is a corporate check when the MICR line comprises an auxiliary on-us field;
    indicating that the check is the corporate check when the auxiliary on-us field is present; and
    communicating the indication and the information about the check to a check processing service that authorizes or declines a check transaction associated with the check;
    wherein the check processing service:
        applies selected corporate rules to the check transaction when the indication indicates that the check is the corporate check;
        notifies the merchant to process the check as a paper check when the check transaction fails the corporate rules;
        performs a risk assessment of the check transaction to authorize or decline the check transaction when the check transaction passes the corporate rules; and
        processes the check as a cash concentration disbursement (CCD) transaction via an automated clearing house (ACH) when the check is authorized.

2. The method of claim 1, wherein the check processing service performs the risk assessment of the check based at least partly on the information about the check to determine whether to authorize or decline the check.

3. The method of claim 1, wherein the processing service determines whether to authorize or decline the check based at least partly on a type of service subscribed by the merchant.

4. The method of claim 3, wherein the check processing service guarantees or purchases the check from the merchant for checks that the check processing service authorizes thereby assuming a risk associated with the check transaction.

5. The method of claim 1, wherein determining whether the check is the corporate check comprises determining whether the auxiliary on-us field is present on the left side of the check's transit field.

6. The method of claim 1, further comprising obtaining an image of at least a portion of the check upon determination that the check is the corporate check.

7. An apparatus for processing a check comprising:
    a scanning component adapted to scan at least a portion of a check received by a merchant at a merchant location to obtain information about the check that facilitates electronic processing of the check wherein the scanned portion of the check includes a magnetic ink character recognition (MICR) line imprinted on the check;
    a processor configured to determine that the check is a corporate check when the MICR line comprises an auxiliary on-us field, wherein the processor is further configured to indicate that the check is the corporate check when the auxiliary on-us field is present; and
    a communication component that facilitates communicating the indication and the information about the check to a check processing service that authorizes or declines a check transaction associated with the check;
    wherein the check processing service:
        applies selected corporate rules to the check transaction when the indication indicates that the check is the corporate check;
        notifies the merchant to process the check as a paper check when the check transaction fails the corporate rules;
        performs a risk assessment of the check transaction to authorize or decline the check transaction when the check transaction passes the corporate rules; and
        processes the check as a cash concentration disbursement (CCD) transaction via an automated clearing house (ACH) when the check is authorized.

8. The apparatus of claim 7, wherein the processing service performs the risk assessment of the check based at least partly on the information about the check to determine whether to authorize or decline the check.

9. The apparatus of claim 8, wherein the processing service determines whether to authorize or decline the check based at least partly on a type of service subscribed by the merchant.

10. The apparatus of claim 9, wherein the check processing service guarantees or purchases the check from the merchant for checks that the check processing service authorizes thereby assuming a risk associated with the check transaction.

11. The apparatus of claim 7, wherein the processor determines whether the check is the corporate check by determining whether the auxiliary on-us field is present on the left side of the check's transit field.

12. The apparatus of claim 7, wherein the processor further induces obtaining of an image of at least a portion of the check upon determination that the check is the corporate check.

13. A method of processing a check transaction comprising:
  obtaining information about a check transaction to allow at least a portion of subsequent processing of the check transaction to be performed electronically;
  determining whether the check transaction is a corporate check transaction or a non-corporate check transaction based on the presence or absence of a field associated with the information about the check transaction;
  indicating that the check transaction is the corporate check transaction when the field is present; and
  communicating the indication and the information about the check transaction to a check processing service that authorizes or declines the check transaction;
  wherein the check processing service:
    applies selected corporate rules to the check transaction when the indication indicates that the check transaction is the corporate check transaction;
    notifies a merchant to process the check transaction as a paper check transaction when the check transaction fails the corporate rules;
    performs a risk assessment of the check transaction to authorize or decline the check transaction when the check transaction passes the corporate rules; and
    processes the check as a cash concentration disbursement (CCD) transaction via an automated clearing house (ACH) when the check transaction is authorized.

14. The method of claim 13, wherein obtaining information about the check transaction comprises scanning a check.

15. The method of claim 14, wherein scanning the check includes reading a magnetic ink character recognition (MICR) line imprinted on the check.

16. The method of claim 15, wherein determining whether the check transaction is a corporate check transaction comprises determining the presence or absence of an auxiliary on-us field on the MICR line wherein the presence of the auxiliary on-us field is indicative of the corporate check transaction.

17. The method of claim 16, wherein determining the presence or absence of the auxiliary on-us field on the MICR line comprises determining whether the auxiliary on-us field is present on the left side of the check's transit field.

18. The method of claim 13, wherein the field comprises an auxiliary on-us field on a magnetic ink character recognition (MICR) line associated with the corporate check transaction.

19. The method of claim 13, wherein the check processing service performs the risk assessment of the check transaction based at least partly on the information about the check transaction to determine whether to authorize or decline the check transaction.

20. The method of claim 13, wherein the check processing service determines whether to authorize or decline the check transaction based at least partly on a type of service subscribed by a merchant.

21. The method of claim 20, wherein the type of service includes the check processing service guaranteeing the check transaction or purchasing the check transaction from the merchant for checks that the check processing service authorizes thereby assuming a risk associated with the check transaction.

22. The method of claim 13, further comprising obtaining and retaining an image of at least a portion of a check associated with the check transaction upon determination that the check transaction is the corporate check transaction.

23. A method of conducting a financial transaction, comprising:
  obtaining information about a financial transaction to allow at least a portion of subsequent processing of the financial transaction to be performed electronically wherein the information is obtained via an electronic device associated with a merchant involved in the financial transaction, wherein the financial transaction comprises a check transaction;
  determining whether the check transaction is a corporate type transaction or a non-corporate type transaction based on the presence or absence of a field associated with the information, wherein determination of whether the financial transaction is the corporate or the non-corporate type is performed at the electronic device associated with the merchant;
  indicating that the check transaction is the corporate type transaction if the field is present; and
  communicating the indication and the information about the check transaction to a check processing service that authorizes or declines the check transaction;
  applying selected corporate rules to the check transaction when the indication indicates that the check transaction is the corporate type transaction;
  notifying the merchant to process the check transaction as a paper check transaction when the check transaction fails the corporate rules;
  performing a risk assessment of the check transaction to authorize or decline the check transaction when the check transaction passes the corporate rules; and
  processing the check transaction as a cash concentration disbursement (CCD) transaction via an automated clearing house (ACH) when the check transaction is authorized.

24. The method of claim 23, wherein obtaining information comprises scanning a check.

25. The method of claim 23, wherein obtaining information comprises capturing information input into a computing device.

26. The method of claim 25, wherein the computing device is configured to perform a web based financial transaction.

27. The method of claim 23, wherein obtaining information comprises capturing information input into a telephone during a telephone based financial transaction.

28. The method of claim 23, wherein obtaining information includes reading magnetic ink character recognition (MICR) information associated with the check transaction.

29. The method of claim 28, wherein determining whether the check transaction is the corporate type or the non-corporate type transaction comprises determining whether the MICR information includes an auxiliary on-us field wherein the presence of the auxiliary on-us field is indicative that the check transaction is the corporate type transaction.

30. The method of claim 23, wherein the check processing service performs the risk assessment of the check transaction based at least partly on the information about the check transaction to determine whether to authorize or decline the check transaction.

31. The method of claim 23, wherein the check processing service determines whether to authorize or decline the check transaction based at least partly on a type of service subscribed by the merchant.

32. The method of claim 31, wherein the type of service includes the check processing service guaranteeing the check transaction or purchasing the check transaction from the merchant for checks that the check processing service authorizes thereby assuming a risk associated with the check transaction.

33. The method of claim 23, further comprising obtaining and retaining an image of at least a portion of a check for financial transactions involving checks upon determination that the financial transaction is the corporate type.

34. An apparatus for conducting a financial transaction, comprising:
an electronic device that obtains information about a financial transaction wherein the electronic device is configured to capture a field associated with the information and wherein the electronic device is associated with a merchant involved in the financial transaction; and
a processor configured to induce the capture of the field and to detect the presence of the field, wherein the processor determines whether the financial transaction is a corporate type transaction or a non-corporate type transaction based on the presence or absence of the field, and the processor provides an indication that the financial transaction is the corporate type transaction when the field is present, wherein the financial transaction comprises a check transaction and wherein a check processing service:
applies selected corporate rules to the check transaction when the indication indicates that the check transaction is the corporate type transaction;
notifies a merchant to process the check transaction as a paper check transaction when the check transaction fails the corporate rules;
performs a risk assessment of the check transaction to authorize or decline the check transaction when the check transaction passes the corporate rules; and
processes the check transaction as a cash concentration disbursement (CCD) transaction via an automated clearing house (ACH) when the check transaction is authorized.

35. The apparatus of claim 34, wherein the electronic device comprises a check scanner adapted to capture at least a portion of a check the check scanner scans.

36. The apparatus of claim 34, wherein the electronic device comprises a computing device configured to capture the information about the check transaction.

37. The apparatus of claim 36, wherein the computing device is configured to perform a web based financial transaction.

38. The apparatus of claim 34, wherein the electronic device comprises a telephone based device adapted to allow a telephone based financial transaction.

39. The apparatus of claim 34, wherein the information about the financial transaction obtained by the electronic device includes magnetic ink character recognition (MICR) information associated with the check transaction.

40. The apparatus of claim 39, wherein the processor determines whether the check transaction is a corporate type or a non-corporate type transaction by determining whether the MICR information includes an auxiliary on-us field wherein the presence of the auxiliary on-us field is indicative that the check transaction is the corporate type transaction.

41. The apparatus of claim 34, wherein the processor denotes the information about the check transaction in a manner that allows processing of the check transaction as the corporate check transaction if the field is present.

42. The apparatus of claim 34, further comprising a communication component configured to communicate the information about the check transaction to the check processing service that authorizes or declines the check transaction.

43. The apparatus of claim 34, wherein the check processing service performs the risk assessment of the check transaction based at least partly on the information about the check transaction to determine whether to authorize or decline the check transaction.

44. The apparatus of claim 34, wherein the check processing service determines whether to authorize or decline the check transaction based at least partly on a type of service subscribed by the merchant.

45. The apparatus of claim 44, wherein the type of service includes the check processing service guaranteeing the check transaction or purchasing the check transaction from the merchant for checks that the check processing service authorizes thereby assuming a risk associated with the check transaction.

46. The apparatus of claim 34, wherein the processor obtains an image of at least a portion of a check for financial transactions involving checks upon determination that the financial transaction is the corporate type.

47. An apparatus for conducting a financial transaction, comprising:
means for reading magnetic ink character recognition (MICR) information from a check associated with a check transaction;
means for determining that the check transaction is a corporate type transaction when the MICR information includes an auxiliary on-us field;
means for indicating that the check transaction is the corporate type transaction when the auxiliary on-us field is present; and
means for communicating the indication and the information about the check transaction to a check processing service that authorizes or declines the check transaction, the check processing service comprising:
means for applying selected corporate rules to the check transaction when the indication indicates that the check is a corporate check;
means for notifying a merchant to process the check as a paper check when the check transaction fails the corporate rules;
means for performing a risk assessment of the check transaction to authorize or decline the check transaction when the check transaction passes the corporate rules; and
means for processing the check transaction as a cash concentration disbursement (CCD) transaction via an automated clearing house (ACH) when the check transaction is authorized.

48. The apparatus of claim 47, wherein the information about the check transaction is obtained by scanning the check.

49. The apparatus of claim 47, wherein the information about the check transaction is obtained by a computing device.

50. The apparatus of claim 49, wherein the computing device is configured to perform a web based financial transaction.

51. The apparatus of claim 47, wherein the information about the check transaction is obtained by a telephone based device adapted to perform a telephone based financial transaction.

52. The apparatus of claim 47, wherein the check processing service performs the risk assessment of the check based at least partly on the information about the check transaction to determine whether to authorize or decline the check.

53. The apparatus of claim 47, wherein the check processing service determines whether to authorize or decline the check transaction based at least partly on a type of service subscribed by a merchant.

54. The apparatus of claim 53, wherein the type of service includes the check processing service guaranteeing the check transaction or purchasing the check transaction from the merchant for checks that the check processing service authorizes thereby assuming a risk associated with the check transaction.

55. The apparatus of claim 47, wherein the means for determining further comprises obtaining an image of at least a portion of a check for financial transactions involving checks upon determination that the financial transaction is the corporate type.

* * * * *

UNITED STATES PATENT AND TRADEMARK OFFICE
CERTIFICATE OF CORRECTION

PATENT NO. : 7,108,174 B2 Page 1 of 1
APPLICATION NO. : 10/674801
DATED : September 19, 2006
INVENTOR(S) : Sellen et al.

It is certified that error appears in the above-identified patent and that said Letters Patent is hereby corrected as shown below:

On Title Page, Item (56) (U.S. Patent Documents), line 4, after "6,902,105" delete "B1" and insert --B2 --, therefor.

At column 3, line 60, delete "of," and insert -- of --, therefor.

At column 6, line 17, delete "partly:on" and insert -- partly on --, therefor.

At column 12, line 27 delete "below:" and insert -- below.--, therefor.

At column 12, line 57, delete "path." and insert -- path --, therefor.

At column 13, line 52, delete "in-reference" and insert --in reference --, therefor.

At column 14, line 8, delete "step." and insert -- step --, therefor.

At column 14, line 46, delete "determination:" and insert -- determination --, therefor.

At column 15, line 30, delete "they" and insert -- the --, therefor.

At column 18, line 66, delete "process." and insert -- process --, therefor.

At column 21, line 65, in Claim 1, delete "cheek" and insert -- check --, therefor.

At column 23, line 53, in Claim 16, delete "a" and insert -- the --, therefor.

Signed and Sealed this

Sixteenth Day of January, 2007

JON W. DUDAS
*Director of the United States Patent and Trademark Office*